United States Patent
Lee et al.

(10) Patent No.: US 10,938,532 B2
(45) Date of Patent: Mar. 2, 2021

(54) CSI-RS CONFIGURATION METHOD AND APPARATUS FOR BEAM MANAGEMENT IN WIRELESS COMMUNICATION SYSTEM

(71) Applicant: LG ELECTRONICS INC., Seoul (KR)

(72) Inventors: Kilbom Lee, Seoul (KR); Kijun Kim, Seoul (KR); Jiwon Kang, Seoul (KR); Jonghyun Park, Seoul (KR); Minki Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/476,848

(22) PCT Filed: Jan. 9, 2018

(86) PCT No.: PCT/KR2018/000404
§ 371 (c)(1),
(2) Date: Jul. 9, 2019

(87) PCT Pub. No.: WO2018/128520
PCT Pub. Date: Jul. 12, 2018

(65) Prior Publication Data
US 2019/0356439 A1    Nov. 21, 2019

Related U.S. Application Data

(60) Provisional application No. 62/444,300, filed on Jan. 9, 2017.

(51) Int. Cl.
*H04L 5/00* (2006.01)
*H04B 7/0408* (2017.01)
(Continued)

(52) U.S. Cl.
CPC .......... *H04L 5/0048* (2013.01); *H04B 7/0408* (2013.01); *H04W 72/0413* (2013.01); *H04W 74/0833* (2013.01)

(58) Field of Classification Search
CPC combination set(s) only.
See application file for complete search history.

(56) References Cited

U.S. PATENT DOCUMENTS

2016/0373178 A1   12/2016   Nam et al.
2018/0042000 A1*   2/2018   Zhang ................... H04W 72/04

OTHER PUBLICATIONS

PCT International Application No. PCT/KR2018/000404, Written Opinion of the International Searching Authority dated Apr. 9, 2018, 23 pages.

(Continued)

*Primary Examiner* — Ronald B Abelson
(74) *Attorney, Agent, or Firm* — Lee, Hong, Degerman, Kang & Waimey PC

(57) ABSTRACT

According to one embodiment of the present disclosure, a method for determining a beam used in communication by a terminal in a mmWave communication system can be provided. The method for determining the beam may comprise a step of receiving CSI-RS from a base station, and a step of determining the beam on the basis of the CSI-RS. A CSI-RS resource and a CSI-RS port are determined on the basis of the CSI-RS, and the determined beam may correspond to the CSI-RS resource and the CSI-RS port.

13 Claims, 17 Drawing Sheets

(51) Int. Cl.
　　　*H04W 72/04*　　　(2009.01)
　　　*H04W 74/08*　　　(2009.01)

(56) References Cited

OTHER PUBLICATIONS

Samsung, "DL beam management RS for multi-beam > 6GHZ NR system", 3GPP TSG RAN WG1 Meeting #87, R1-1612495, Nov. 2016, 5 pages.
Huawei, et al., "DL RS Design for NR Beam Management", 3GPP TSG RAN WG1 Meeting #87, R1-1611242, Nov. 2016, 5 pages.
Samsung, "Discussion on DL beam management procedures P-2 and P-3", 3GPP TSG RAN WG1 Meeting #87, R1-1612509, Nov. 2016, 4 pages.
Qualcomm, "Beam Recovery Procedures", 3GPP TSG RAN WG1 Meeting #87, R1-1612059, Nov. 2016, 3 pages.

\* cited by examiner

FIG. 11
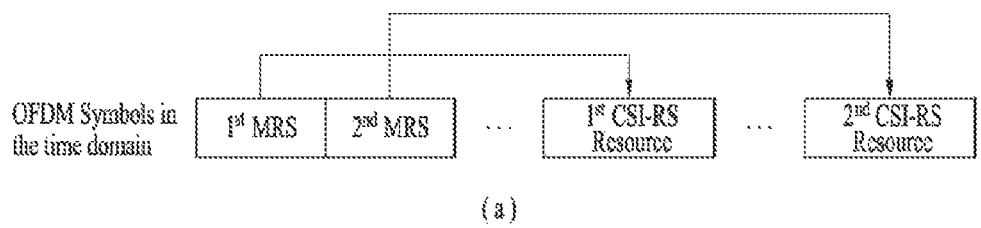
(a)
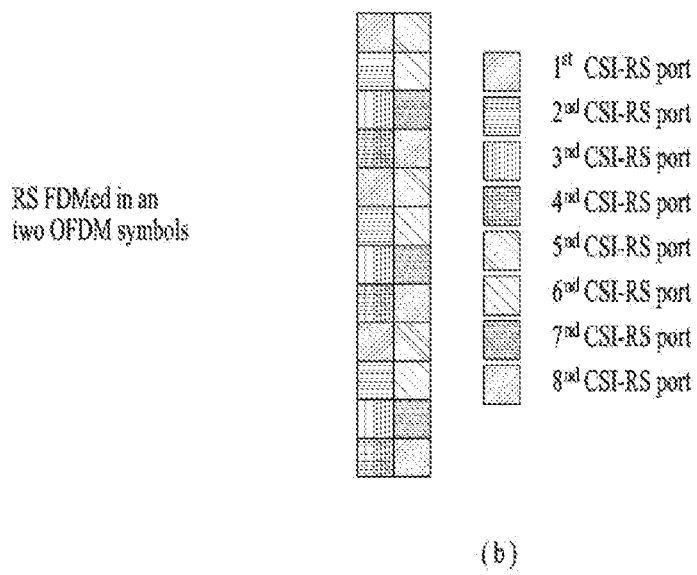
(b)

FIG. 13
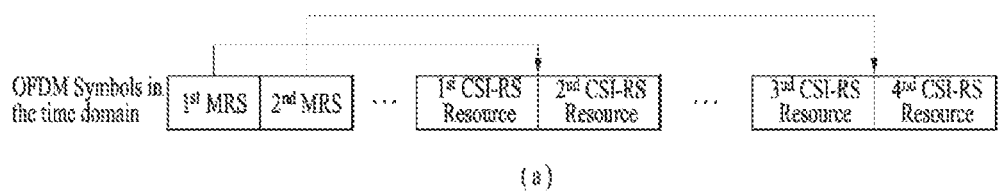
(a)
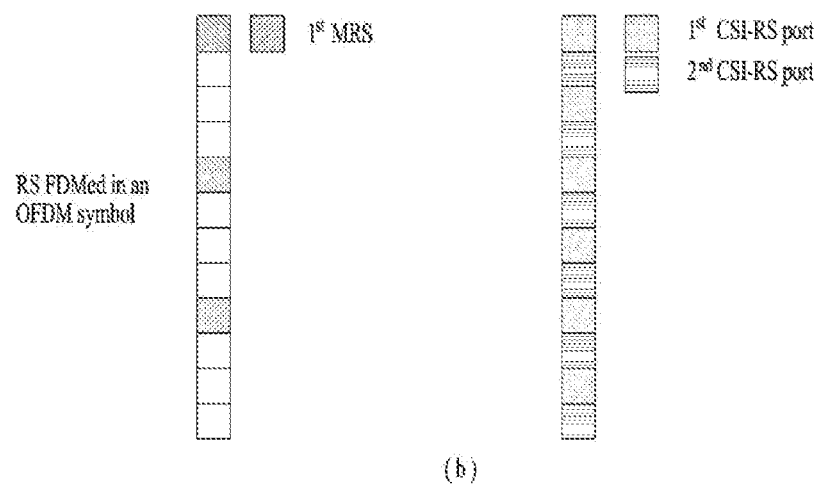
(b)

| 1st CSI-RS Resource | 2nd CSI-RS Resource | 3rd CSI-RS Resource | 4th CSI-RS Resource |
|---|---|---|---|

(a)

| 1st CSI-RS Resource | 1st CSI-RS Resource | 1st CSI-RS Resource | 1st CSI-RS Resource |
|---|---|---|---|

| 1st CSI-RS Resource | 2nd CSI-RS Resource | 3rd CSI-RS Resource | 4th CSI-RS Resource | 5th CSI-RS Resource | 6th CSI-RS Resource | 7th CSI-RS Resource |

(a)

Type 1

| 1st CSI-RS Resource | 2nd CSI-RS Resource | 3rd CSI-RS Resource | 4th CSI-RS Resource | 5th CSI-RS Resource | 6th CSI-RS Resource | 7th CSI-RS Resource |

Type 2

| 1st CSI-RS Resource | 2nd CSI-RS Resource | 3rd CSI-RS Resource | 4th CSI-RS Resource | 5th CSI-RS Resource | 6th CSI-RS Resource | 7th CSI-RS Resource |

(b)

CSI-RS CONFIGURATION METHOD AND APPARATUS FOR BEAM MANAGEMENT IN WIRELESS COMMUNICATION SYSTEM

CROSS-REFERENCE TO RELATED APPLICATIONS

This application is the National Stage filing under 35 U.S.C. 371 of International Application No. PCT/KR2018/000404, filed on Jan. 9, 2018, which claims the benefit of U.S. Provisional Application No. 62/444,300, filed on Jan. 9, 2017, the contents of which are all hereby incorporated by reference herein in their entirety.

TECHNICAL FIELD

The present disclosure relates to a wireless communication system, and more particularly, to a method and apparatus for configuring a channel state information-reference signal (CSI-RS) for hierarchical beam management in a system.

BACKGROUND ART

An ultrahigh frequency wireless communication system based on mmWave is configured to operate at a center frequency of several GHz to several tens of GHz. Due to the characteristic of the center frequency, a pathloss may considerably occurs in a radio shadow area. Considering the pathloss, it is necessary to control and prevent beam mismatch as well as to elaborately design beamforming for a signal transmitted to a user equipment (UE) in the mmWave communication system. For this purpose, there may exist a need for a beam configuration method for beam management.

DISCLOSURE

Technical Problem

An aspect of the present disclosure devised to solve the conventional problem is to provide a beam management method.

Another aspect of the present disclosure is to provide a method of designing a channel state information-reference signal (CSI-RS) for beam management in a wireless communication system.

Another aspect of the present disclosure is to provide a method of managing beams by configuring beams as a primary beam and a secondary beam.

Another aspect of the present disclosure is to provide a method of performing beam recovery from beam mismatch.

Technical Solution

According to an embodiment of the present disclosure, a method of determining a beam to be used for communication by a user equipment (UE) in a millimeter wave (mmWave) communication system includes receiving a channel state information-reference signal (CSI-RS) from a base station (BS), and determining the beam based on the CSI-RS. A CSI-RS resource and a CSI-RS port may be determined based on the CSI-RS, and the determined beam may correspond to the CSI-RS resource and the CSI-RS port.

According to an embodiment of the present disclosure, a UE for determining a beam to be sued for communication in a mmWave communication system includes a receiver configured to receive a signal from an external device, a transmitter configured to transmit a signal to an external device, and a processor configured to control the receiver and the transmitter. The processor may be configured to receive a CSI-RS from a BS through the receiver, and to determine the beam based on the CSI-RS. A CSI-RS resource and a CSI-RS port may be determined based on the CSI-RS, and the determined beam may correspond to the CSI-RS resource and the CSI-RS port.

The following may be applied commonly to the method and apparatus for determining a beam to be used for communication in a mmWave communication system.

According to an embodiment of the present disclosure, the CSI-RS resource may correspond to a primary beam, and the CSI-RS port may correspond to a secondary beam.

Further, according to an embodiment of the present disclosure, the UE may acquire information about at least one primary beam and information about at least one secondary beam based on the received CSI-RS, and feed back information about a preferred primary beam among the at least one primary beam and information about a preferred secondary beam among the at least one secondary beam to the BS.

According to an embodiment of the present disclosure, the information about the preferred primary beam and the information about the preferred secondary beam may be transmitted in at least one of a random access channel (RACH), a medium access control-control element (MAC-CE), or uplink data.

Further, according to an embodiment of the present disclosure, the information about the preferred primary beam may be fed back as a CSI-RS resource index to the BS, and the information about the preferred secondary beam may be fed back as a CSI-RS port index to the BS.

According to an embodiment of the present disclosure, when the UE changes the determined beam, the UE may change the beam based on a P2 procedure and a P3 procedure. The P2 procedure may be a procedure in which the beam is changed by sweeping downlink transmission beams of the BS and fixing an uplink reception beam of the UE, and the P3 procedure may be a procedure in which the beam is changed by fixing a downlink transmission beam of the BS, and sweeping uplink reception beams of the UE.

Further, according to an embodiment of the present disclosure, the UE may receive CSI-RS resource configuration information for the P2 procedure and the P3 procedure from the BS, and the CSI-RS resource configuration information may include information about at least one of a cell identifier (ID), a transmission period, a time-domain offset, or a repetition number.

Further, according to an embodiment of the present disclosure, the BS may transmit the downlink transmission beam according to the repetition number in the P3 procedure.

Further, according to an embodiment of the present disclosure, the primary beam may correspond to a wide beam or rough beam, and the secondary beam may correspond to a narrow beam or fine beam.

Further, according to an embodiment of the present disclosure, the primary beam may be at least one of a synchronization signal block (SSB), a CSI-RS, or a measurement reference signal (MRS), and the secondary beam may be a CSI-RS.

Further, according to an embodiment of the present disclosure, when the UE fails to detect a configured secondary beam or reports a beam recovery signal, the UE may reconfigure a CSI-RS resource set or a CSI-RS resource subset by a higher-layer signal.

Further, according to an embodiment of the present disclosure, the UE may request changing of the CSI-RS resource set or the CSI-RS resource subset by at least one of a random access channel (RACH), scheduling request (SR), or a physical uplink control channel (PUCCH).

Further, according to an embodiment of the present disclosure, the CSI-RS may a reference signal used for beam management, and may correspond to at least one of an MRS or an SSB.

Advantageous Effects

The present disclosure may provide a beam management method.

The present disclosure may provide a method of designing a channel state information-reference signal (CSI-RS) for beam management in a wireless communication system.

The present disclosure may provide a method of managing beams by configuring beams as a primary beam and a secondary beam.

The present disclosure may provide a method of performing beam recovery from beam mismatch.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, illustrate embodiments of the disclosure and together with the description serve to explain the principle of the disclosure. The technical features of the present disclosure are not limited to specific drawings and the features shown in the drawings are combined to construct a new embodiment. Reference numerals of the drawings mean structural elements.

FIG. 11 is a diagram illustrating a method of allocating MRSs and CSI-RS resources in the time and frequency domains;

FIG. 13 is a diagram illustrating a method of allocating MRSs and CSI-RS resources in the time domain;

FIG. 23 is a diagram illustrating a zero power CS-RS;

BEST MODE FOR CARRYING OUT THE DISCLOSURE

Figure 1:
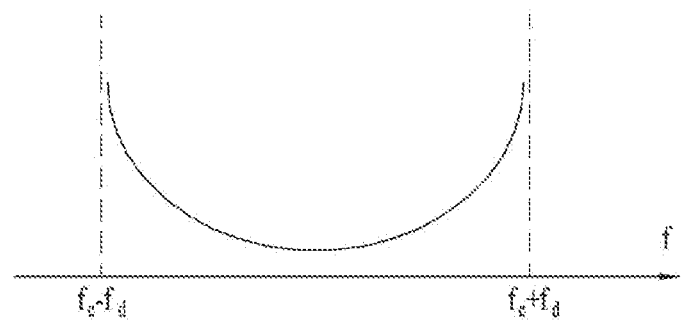
FIG. 1 is a diagram illustrating a Doppler spectrum.

Although the terms used in the present disclosure are selected from generally known and used terms, terms used herein may be varied depending on an operator's intention or customs in the art, appearance of new technology, or the like. In addition, some of the terms mentioned in the description of the present disclosure have been selected by the applicant at his or her discretion, the detailed meanings of which are described in relevant parts of the description herein. Furthermore, it is required that the present disclosure is understood, not simply by the actual terms used but by the meanings of each term lying within.

The following embodiments are proposed by combining constituent components and characteristics of the present disclosure according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present disclosure. The order of operations to be disclosed in the embodiments of the present disclosure may be changed. Some components or characteristics of any embodiment may also be included in other embodiments, or may be replaced with those of the other embodiments as necessary.

In describing the present disclosure, if it is determined that the detailed description of a related known function or construction renders the scope of the present disclosure unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present disclosure (particularly, the context of the following claims) clearly indicates otherwise.

In this document, the embodiments of the present disclosure have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present disclosure can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present disclosure clear, may be supported by the above documents.

In addition, all the terms disclosed in the present document may be described by the above standard documents. In particular, the embodiments of the present disclosure may be supported by at least one of P802.16-2004, P802.16e-2005, P802.16.1, P802.16p and P802.16.1b documents, which are the standard documents of the IEEE 802.16 system.

Hereinafter, the preferred embodiments of the present disclosure will be described with reference to the accompanying drawings. It is to be understood that the detailed description which will be disclosed along with the accompanying drawings is intended to describe the exemplary embodiments of the present disclosure, and is not intended to describe a unique embodiment which the present disclosure can be carried out.

It should be noted that specific terms disclosed in the present disclosure are proposed for convenience of description and better understanding of the present disclosure, and the use of these specific terms may be changed to another format within the technical scope or spirit of the present disclosure.

1. Communication System Using Ultrahigh Frequency Band

In an LTE (Long Term Evolution)/LTE-A (LTE Advanced) system, an error value of oscillators between a UE and an eNB is defined by requirements as follows.

UE side frequency error (in TS 36.101)

The UE modulated carrier frequency shall be accurate to within 0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
|---|---|
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, an offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

TABLE 2

| Center frequency | Oscillator Offset | | | |
|---|---|---|---|---|
| (subcarrier spacing) | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25 kHz is used, whereby throughput degradation is avoided considering Doppler effect for each center frequency. The above Table 2 is a simple example, and it will be apparent that another subcarrier spacing may be used for the center frequency.

Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler}=$ $(v/\lambda)\cos \theta$. At this time, v is a moving speed of the UE, and λ means a wavelength of a center frequency of a radio wave which is transmitted. θ means an angle between the radio wave and a moving direction of the UE. Hereinafter, description will be given on the assumption that θ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \qquad \text{[Equation 1]}$$

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $f_c$ and a maximum Doppler spread value is $f_d$.

Figure 2:
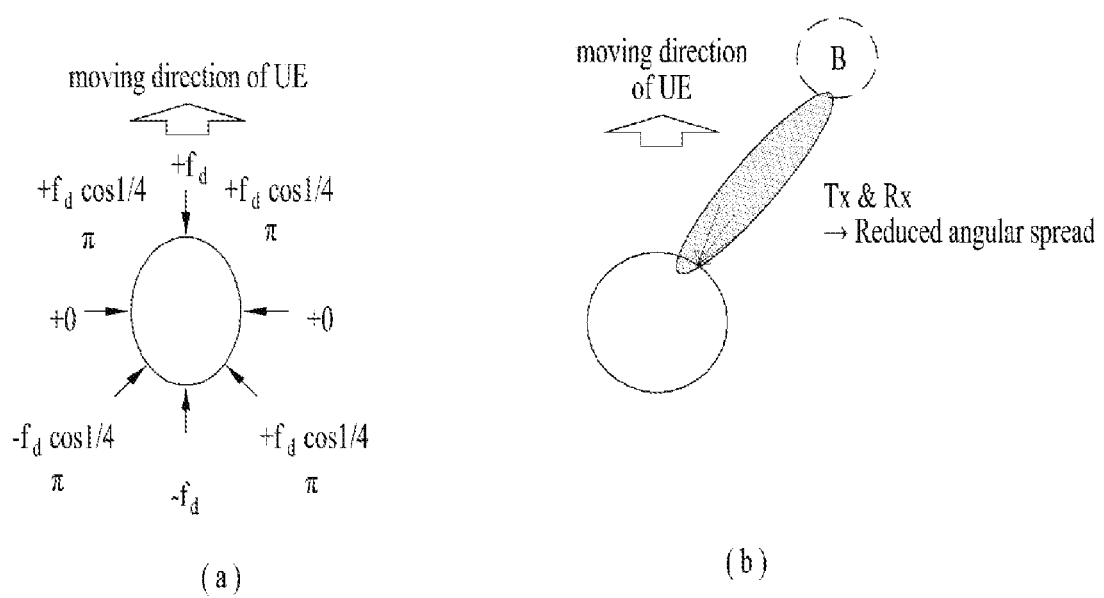
FIG. 2 is a diagram illustrating narrow beamforming related to the present disclosure.
Figure 3:
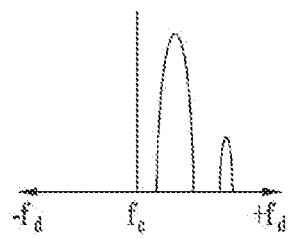
FIG. 3 is a diagram illustrating a Doppler spectrum when narrow beamforming is performed.

FIG. 2 is a diagram illustrating narrow beamforming related to the present disclosure, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

The aforementioned wireless communication system using the ultrahigh frequency band operates on a band having a center frequency ranging from several GHz to several tens of GHz. The characteristics of such a center frequency further worsen Doppler Effect generated from migration of a user equipment or influence of CFO due to an oscillator difference between a transmitter and a receiver.

Figure 4:
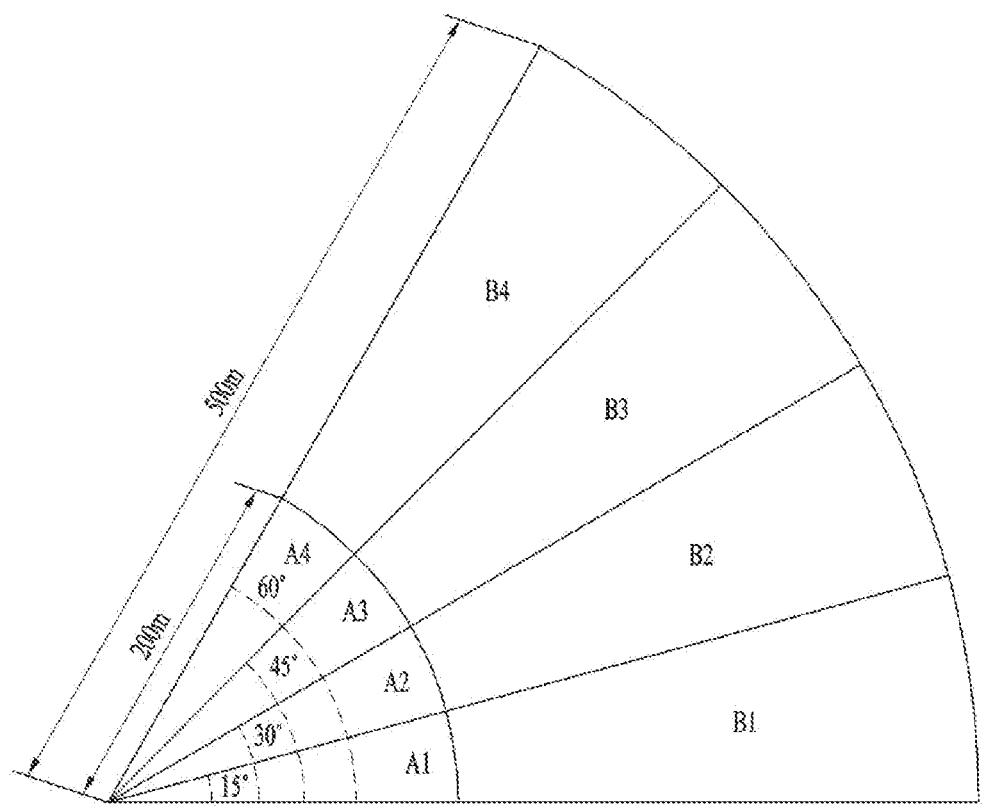
FIG. 4 is a diagram illustrating an example of a synchronization signal service area of a base station (BS)

FIG. 4 is a diagram showing an example of a synchronization signal service area of a base station.

A user equipment (hereinafter abbreviated UE) performs synchronization with a base station using a downlink (DL) synchronization signal transmitted by the base station. In such a synchronization procedure, timing and frequency are synchronized between the base station and the UE. In order to enable UEs in a specific cell to receive and use a synchronization signal in a synchronization procedure, the base station transmits the synchronization signal by configuring a beam width as wide as possible.

Meanwhile, in case of an mmWave communication system that uses a high frequency band, a path loss in synchronization signal transmission appears greater than that of a case of using a low frequency band. Namely, a system using a high frequency band has a supportable cell radius reduced more than that of a related art cellular system (e.g., LTE/LTE-A) using a relatively low frequency band (e.g., 6 GHz or less).

As a method for solving the reduction of the cell radius, a synchronization signal transmitting method using a beamforming may be used. Although a cell radius increases in case of using a beamforming, a beam width is reduced disadvantageously. Equation 2 shows variation of a received signal SINR according to a beam width.

$$W \rightarrow M^{-2}W \qquad \text{[Equation 2]}$$

SINR→$M^2$SINR

If a beam width is reduced by $M^{-2}$ time according to a beamforming, Equation 2 indicates that a received SINR is improved by $M^2$ times.

Beside such a beamforming scheme, as another method for solving the cell radius reduction, it is able to consider a scheme of transmitting a same synchronization signal repeatedly. In case of such a scheme, although an addition resource allocation is necessary or a time axis, a cell radius can be advantageously increased without a decrease of a beam width.

Meanwhile, a base station allocates a resource to each UE by scheduling a frequency resource and a time resource located in a specific section. In the following, such a sp4cific section shall be defined as a sector. In the sector shown in FIG. 4, A1, A2, A3 and A4 indicate sectors having widths of 0~15', 15~30', 30~45' and 45~60' in radius of 0~200 m, respectively. B1, B2, B3 and B4 indicate sectors having widths of 0~15', 15~30', 30~45' and 45~60' in radius of 200~500 m, respectively. Based on the substance shown in FIG. 4, sector 1 is defined as {A1, A2, A3, A4} and sector 2 is defined as {A1, A2, A3, A4, B1, B2, B3, B4}. Moreover, if a current synchronization signal service area of a base station is the sector 1, in order for the base station to service a synchronization signal for the sector 2, assume that an additional power over 6 dB is required for a transmission of a synchronization signal.

First of all, in order to service the sector 2, the base station can obtain an additional gain of 6 dB using a beamforming scheme. Through such a beamforming process, a service radius can be extended from A1 to B1. Yet, since a beam width is reduced through the beamforming, A2 to A3 cannot be serviced simultaneously. Hence, when a beamforming is performed, a synchronization signal should be sent to each of the A2~B2, A3~B3, and A4~B4 sectors separately. So to speak, in order to service the sector 2, the base station should transmit the synchronization signal by performing the beamforming four times.

On the other hand, considering the aforementioned repetitive transmission of the synchronization signal, the base station may be able to transmit the synchronization signal to the whole sector 2. Yet, the synchronization signal should transmit the synchronization signal on a time axis repeatedly four times. Consequently, a resource necessary to service the sector 2 is identical for both a beamforming scheme and a repetitive transmission scheme.

Yet, since abeam width is narrow in case of ta beamforming scheme, a UE moving fast or a UE located on a sector boundary has difficulty in receiving a synchronization signal stably. Instead, if an ID of a UE located beam is identifiable, a UE can advantageously grasp its location through a synchronization signal. On the contrary, since a beam width is wide in case of a repetitive transmission scheme, it is less probable that a UE misses a synchronization signal. Instead, the UE is unable to grasp its location.

Figure 5:
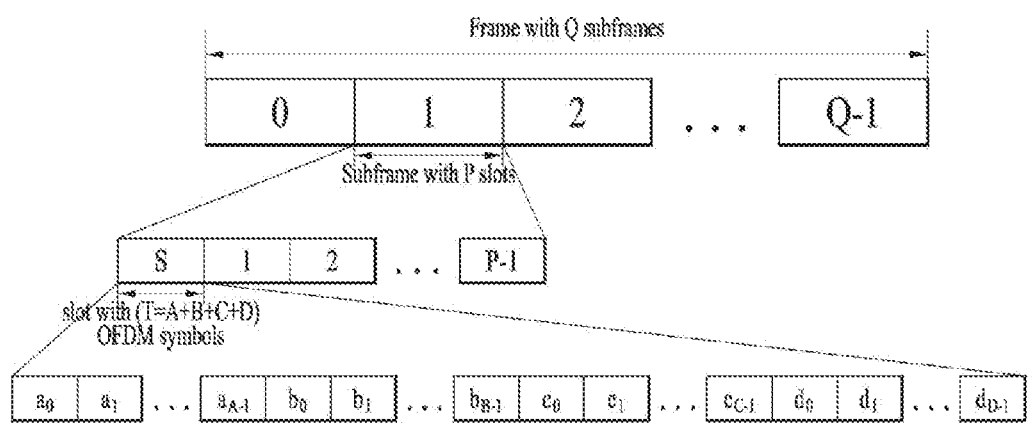
FIG. 5 shows an example of a frame structure proposed in a communication environment that uses mmWave.

FIG. 5 shows an example of a frame structure proposed in a communication environment that uses mmWave.

First of all, a single frame is configured with Q subframes, and a single subframe is configured with P slots. And, one slot is configured with T OFDM symbols. Here, unlike other subframes, a first subframe in a frame uses 0th slot (slot denoted by 'S') for the usage of synchronization. And, the 0th slot is configured with A OFDM symbols for timing and frequency synchronization, B OFDM symbols for beam scanning, and C OFDM symbols for informing a UE of system information. And, the remaining D OFDM symbols are used for data transmission to each UE.

Meanwhile, such a frame structure is a simple example only. Q, P, T, S, A, B, C and D are random values, and may include values set by a user or values set automatically on a system.

In the following, algorithm of timing synchronization between abase station and a UE is described. Let's consider a case that the base station transmits the same synchronization signal A times in FIG. 5. Based on the synchronization signal transmitted by the base station, the UE performs timing synchronization using the algorithm of Equation 3.

$$\tilde{n} = \arg\max_{\tilde{n}} \frac{\left|\sum_{i=0}^{A-2} y_{\tilde{n},i}^H y_{\tilde{n},i+1}\right|}{\sum_{i=0}^{A-2} |y_{\tilde{n},i}^H y_{\tilde{n},i+1}|}$$ [Equation 3]

where $y_{\tilde{n},i} \triangleq r[\tilde{n}+i(N+N_g):\tilde{n}+i(N+N_g)+N-1]$

In Equation 3, N, $N_g$ and i indicate a length of OFDM symbol, a length of CP (Cyclic Prefix) and an index of OFDM symbol, respectively. r means a vector of a received signal in a receiver. Here, the equation $y_{\tilde{n},i} \triangleq r[\tilde{n}+i(N+N_g):\tilde{n}+i(N+N_g)+N-1]$ is a vector defined with elements ranging from $(\tilde{n}+i(N+N_g))^{th}$ element to $(\tilde{n}+i(N+N_g)+N-1)^{th}$ element of the received signal vector r.

The algorithm of Equation 3 operates on the condition that 2 OFDM received signals adjacent to each other temporally are equal to each other. Since such an algorithm can use a sliding window scheme, it can be implemented with low complexity and has a property robust to a frequency offset.

Meanwhile, Equation 4 represents an algorithm of performing timing synchronization using correlation between a received signal and a signal transmitted by a base station.

$$\tilde{n} = \arg\max_{\tilde{n}} \frac{\left|\sum_{i=0}^{A-1} y_{\tilde{n},i}^H s\right|^2}{\sum_{i=0}^{A-1} |y_{\tilde{n},i}|^2 \sum_{i=0}^{A-1} |s|^2}$$ [Equation 4]

In Equation 4, s means a signal transmitted by a base station and is a signal vector pre-agreed between a UE and a base station. Although the way of Equation 4 may have performance better than that of Equation 3, since Equation 4 cannot be implemented by a sliding window scheme, it requires high complexity. And, the way of Equation 4 has a property vulnerable to a frequency offset.

In continuation with the description of the timing synchronization scheme, abeam scanning procedure is described as follows. First of all, a beam scanning means an operation of a transmitter and/or a receiver that looks for a direction of a beam that maximizes a received SINR of the receiver. For example, a base station determines a direction of a beam through a beam scanning before transmitting data to a UE.

Further description is made by taking FIG. 4 as one example. FIG. 4 shows that a sector serviced by a single base station is divided into 8 areas. Here, the base station transmits a beam to each of (A1+B1), (A2+B2), (A3+B3) and (A4+B4) areas, and a UE can identify the beams transmitted by the base station. On this condition, a beam scanning procedure can be embodied into 4 kinds of processes. First of all, the base station transmits beams to 4 areas in sequence [i]. The UE determines a beam decided as a most appropriate beam among the beams in aspect of a received SINR [ii]. The UE feds back information on the selected beam to the base station [iii]. The base station transmits data using a beam having the direction of the feedback [iv]. Through the above beam scanning procedure, the UE can receive DL data through a beam having an optimized received SINR.

Zadoff-Chu sequence is described in the following. Zadoff-Chu sequence is called Chu sequence or ZC sequence and defined as Equation 5.

$$X_r[n] = e^{\frac{j\pi rn(n+1)}{N}}$$ [Equation 5]

In Equation 5, N indicates a length of sequence, r indicates a root value, and $x_r[n]$ indicates an nth element of ZC sequence. The ZC sequence is characterized in that all elements are equal to each other in size [constant amplitude]. Moreover, a DFT result of ZC sequence is also identical for all elements.

In the following, ZC sequence and a cyclic shifted version of the ZC sequence have the following correlation such as Equation 6.

$$(x_r^{(i)})^H x_r^{(j)} = \begin{cases} N & \text{for } i = j \\ 0 & \text{elsewhere} \end{cases}$$ [Equation 6]

In Equation 6, $x_r^{(i)}$ is a sequence resulting from cyclic-shifting $x_r$ by i, and indicates 0 except a case that auto-correlation of ZC sequence is i=j. The ZC sequence also has zero auto-correlation property and may be expressed as having CAZAC (Constant Amplitude Zero Auto Correlation) property.

Regarding the final property of the ZC sequence ZC, the correlation shown in Equation 7 is established between ZC sequences having a root value that is a coprime of a sequence length N.

$$x_{r_1}^H x_{r_2} = \begin{cases} N & \text{for } r_1 = r_2 \\ \frac{1}{\sqrt{N}} & \text{elsewhere} \end{cases} \quad \text{[Equation 7]}$$

In equation 7, r1 or r2 is a coprime of N. For example, if N=111, 2≤$r_1$, $r_2$≤110 always meets Equation 7. Unlike auto-correlation of Equation 6, the mutual correlation of ZC sequence does not become 0 completely.

In continuation with ZC sequence. Hadamard matrix is described. The Hadamard matrix is defined as Equation 8.

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}} \quad \text{[Equation 8]}$$

where $H_1 = [1]$ $$H_2 = \begin{bmatrix} 1 & 1 \\ 1 & -1 \end{bmatrix}$$

In Equation 8, $2^k$ indicates a size of matrix. Hadamard matrix is a unitary matrix that always meets $H_n H_n^T = nI_n$ irrespective of a size n. Moreover, in Hadamard matrix, all columns and all rows are orthogonal to each other. For example, if n=4, Hadamard matrix is defined as Equation 9.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{[Equation 9]}$$

From Equation 9, it can be observed that columns and rows are orthogonal to each other.

Figure 6:
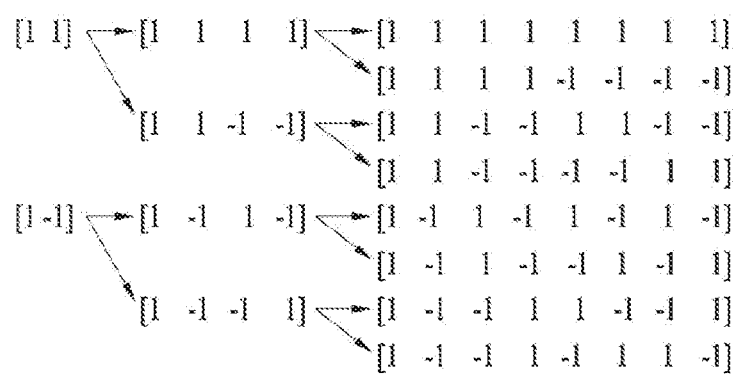
FIG. 6 illustrates a structure of orthogonal variable spreading factor (OVSF) code.

FIG. 6 shows a structure of OVSF (orthogonal variable spreading factor) code. The OVSF code is the code generated on the basis of Hadamard matrix and has specific rules.

First of all, in diverging to the right in the OVSF code [lower branch], a first code repeats a left mother code twice as it is and a second code is generated from repeating an upper code once, inverting it and then repeating the inverted code once. FIG. 6 shows a tree structure of OVSF code.

Such an OVSF code secures all orthogonality except the relation between adjacent mother and child codes on a code tree. For example, in FIG. 6, a code [1−1 1−1] is orthogonal to all of [1 1], [1 1 1 1], and [1 1−1 −1]. Moreover, regarding the OVSF code, a length of code is equal to the number of available codes. Namely, it can be observed from FIG. 6 that a length of a specific ode is equal to the total number in a branch having the corresponding code belong thereto.

Figure 7:
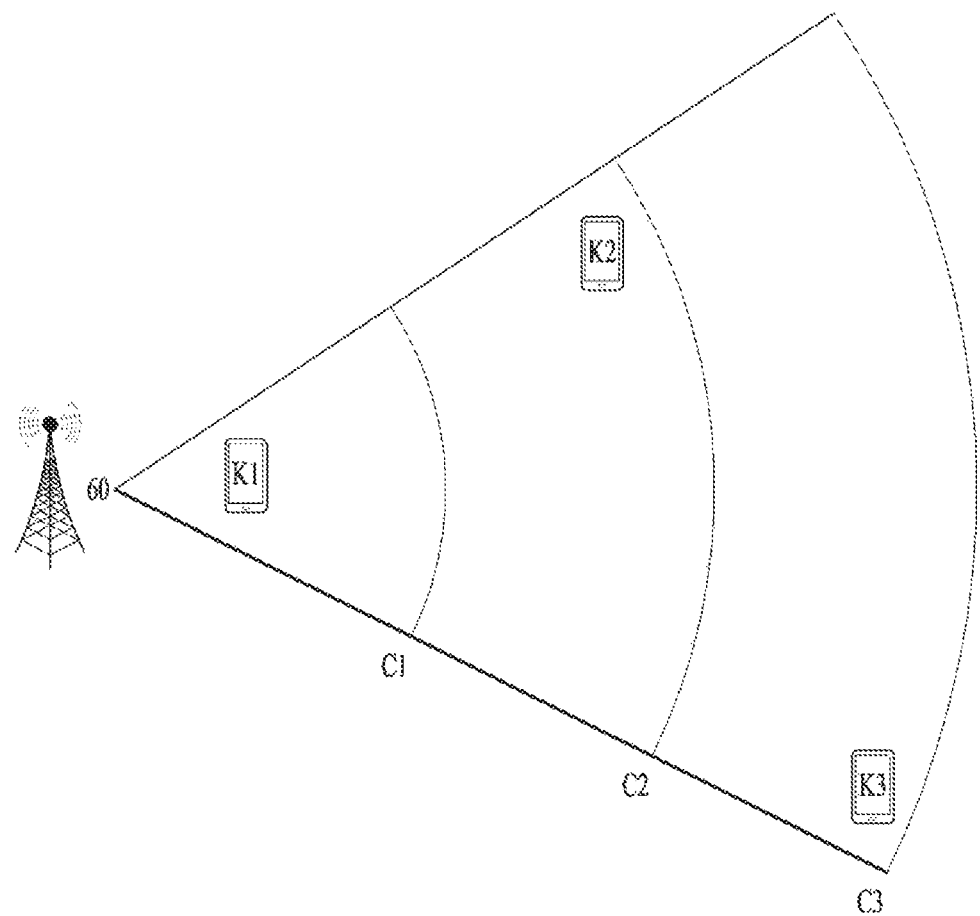
FIG. 7 is a diagram to describe deployment of user equipments (UEs)

FIG. 7 is a diagram to describe a disposed situation of user equipments. RACH (Random Access CHannel) is described with reference to FIG. 7.

In case of LTE system, when RACH signals transmitted by UEs arrive at a base station, powers of the RACH signals of UEs received by the base station should be equal to each other. To this end, the base station defines a parameter 'preambleInitialReceivedTargetPower', thereby broadcasting the parameter to all UEs within a corresponding cell through SIB (System Information Block) 2. The UE calculates a pathloss using a reference signal, and then determines a transmit power of the RACH signal using the calculated pathloss and the parameter 'preambleInitialReceivedTargetPower' like Equation 10.

P_PRACH_Initial=min{P_CMAX,preambleInitialReceivedTargetPower+PL} [Equation 10]

In Equation 10, P_PRACH_Initial, P_CMAX, and PL indicate a transmit power of RACH signal, a maximum transmit power of UE, and a pathloss, respectively.

Equation 10 is taken as one example for the following description. A maximum transmittable power of UE is assumed as 23 dBm, and a RACH reception power of a base station is assumed as −104 dBm. And, a UE disposed situation is assumed as FIG. 7.

First of all, a UE calculates a pathloss using a received synchronization signal and a beam scanning signal and then determines a transmit power based on the calculation. Table 3 shows a pathloss of UE and a corresponding transmit power.

TABLE 3

| UE | preambleInitial Received TargetPower | Pathloss | Necessary transmit power | Transmit power | Additional necessary power |
|----|---|---|---|---|---|
| K1 | −104 dBm | 60 dB | −44 dBm | −44 dBm | 0 dBm |
| K2 | −104 dBm | 110 dB | 6 dBm | 6 dBm | 0 dBm |
| K3 | −104 dBm | 130 dB | 26 dBm | 26 dBm | 3 dBm |

In case of a UE K1 in table 3, a pathloss is very small. Yet, in order to match an RACH reception power, an RACH signal should be transmitted with very small power (−44 dBm). Meanwhile, in case of a UE K2, although a pathloss is big, a necessary transmit power is 6 dBm. Yet, in case of a UE K3, since a pathloss is very big, a necessary transmit power exceeds P_CMA=23 dBm. In this case, the UE should perform a transmission with 23 dBm that is a maximum transmit power and a rate of UE's RACH access success is degraded by 3 dB.

In the following, phase noise related to the present disclosure is explained. Jitter generated on a time axis appears as phase noise on a frequency axis. As shown in equation 11 in the following, the phase noise randomly changes a phase of a reception signal on the time axis.

$$r_n = s_n e^{j\phi_n} \quad \text{[Equation 11]}$$

where $s_n = \sum_{k=0}^{N-1} d_k e^{j2\pi \frac{kn}{N}}$

Parameters $r_n$, $s_n$, $d_k$, $\phi_n$ of the equation 11 respectively indicate a reception signal, a time axis signal, a frequency axis signal, and a phase rotation value due to the phase noise. In the equation 11, if the reception signal is passing through a DFT (Discrete Fourier Transform) procedure, it may be able to have equation 12 described in the following.

$$y_k = d_k \frac{1}{N}\sum_{n=0}^{N-1} e^{jd_n} + \frac{1}{N}\sum_{\substack{t=0 \\ t \neq k}}^{N-1} d_t \sum_{n=0}^{N-1} e^{jd_n} e^{j2\pi(t-k)m/N} \quad \text{[Equation 12]}$$

In Equation 12, $$\frac{1}{N}\sum_{n=0}^{N-1} e^{jd_n}, \frac{1}{N}\sum_{\substack{t=0 \\ t \neq k}}^{N-1} d_t \sum_{n=0}^{N-1} e^{jd_n} e^{j2\pi(t-k)m/N}$$

indicate a CPE (common phase error) and ICI (inter-cell interference), respectively. In this case, as correlation between phase noises is getting bigger, the CPE of the equation 12 has a bigger value. The CPE is a sort of CFO (carrier frequency offset) in a wireless LAN system. However, since the CPE corresponds to phase noise in the aspect of a terminal, the CPE and the CFO can be similarly comprehended.

A terminal eliminates the CPE/CFO corresponding to phase noise on a frequency axis by estimating the CPE/CFO. A procedure of estimating the CPE/CFO on a reception signal should be preferentially performed by the terminal to accurately decode the reception signal. In particular, in order to make the terminal precisely estimate the CPE/CFO, a base station can transmit a prescribed signal to the terminal. The signal transmitted by the base station corresponds to a signal for eliminating phase noise. The signal may correspond to a pilot signal shred between the terminal and the base station in advance or a signal changed or copied from a data signal. In the following a signal for eliminating phase noise is commonly referred to as a PCRS (Phase Compensation Reference Signal), or a PNRS (Phase Noise Reference Signal)

Figure 8:
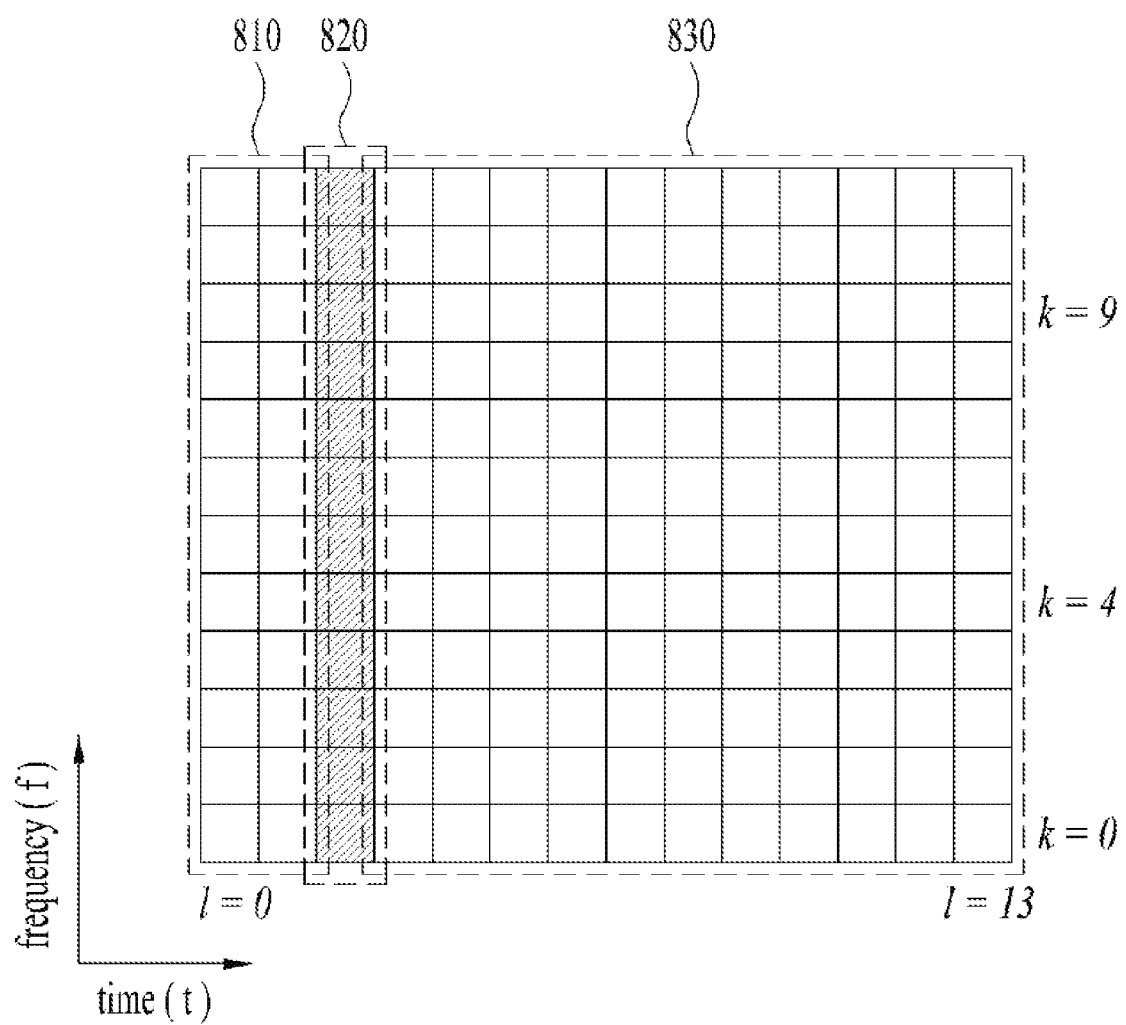
FIG. 8 is a diagram illustrating a resource region structure used in a communication system using mmWave.

FIG. 8 is a diagram illustrating a resource region structure used in a communication system using mmWave. A communication system using such a ultrahigh frequency band as mmWave uses a frequency band having physical characteristic different from that of a legacy LTE/LTE-A communication system. Hence, it is necessary for the communication system using the ultrahigh frequency band to use a structure of a resource region different from a structure of a resource region used in a legacy communication system. FIG. 8 illustrates an example of a downlink resource structure of a new communication system.

It may consider an RB pair consisting of 14 OFDM (Orthogonal Frequency Division Multiplexing) symbols in a horizontal axis and 12 subcarriers in a vertical axis. In this case, first 2 (or 3) OFDM symbols 810 are allocated for a control channel (e.g., PDCCH (Physical Downlink Control Channel)), a next one OFDM symbol 820 is allocated for a DMRS (DeModulation Reference Signal), and the remaining OFDM symbols 830 are allocated for a data channel (e.g., PDSCH (Physical Downlink Shared Channel)).

Meanwhile, in the resource region structure shown in FIG. 8, a PCRS for estimating the aforementioned CPE (or, the CFO), or a PNRS can be transmitted to a terminal in a manner of being carried on a partial RE (resource element) of the region 830 to which a data channel is assigned. The signals correspond to a signal for estimating phase noise. As mentioned in the foregoing description, the signal may correspond to a pilot signal or a signal changed or copied from a data signal.

2. Proposed Information Providing Method

As described before, beamforming may be important to a communication system using the mmWave band. In mmWave, large pathloss may be overcome with a beamforming gain. That is, pathloss arising from the use of a high frequency may be compensated for by a beamforming gain, such that communication is conducted efficiently. For this purpose, a beam may be defined sharply. Accordingly, multiple beams may be defined for one cell. For example, the transmission/reception point (TRP) panel structure defined in 3GPP may be of "4×8×2=M×N×P", In the case of panel-based beam definition, at least 32 beams may be determined.

For example, 112, 224 or 448 beams may be defined in VzW. If there are multiple beams, multiple reference signal (RS) resources may be required. That is, an eNB should show all of multiple beams, which may lead to a large RS requirement. Further, in order to distinguish multiple beams from one another, a large number of bits may be needed correspondingly. For example, 32 beams may be represented in 5 bits, and for more beams, more bits may be needed. As a consequence, signaling overhead may increase.

As described above, hierarchical beam grouping may be required for efficient management of multiple beams. To do so, channel state information-reference signal (CSI-RS) resources may be applied. Although CSI-RS resources are used for link quality in the legacy LTE system, CSI-RS resources for beams may be applied separately. For example, the legacy LTE CSI-RS resources may be of CSI-RS resource type I. On the other hand, the CSI-RS resources for beams may be referred to as CSI-RS resource type II, to which the present disclosure is not limited. However, the following description is given with the appreciation that CSI-RS resources are of CSI-RS type II. Further, RS resources defined for beams may refer to the above-described CSI-RS resources, although under a different name, and thus are not limited to any particular names.

2-1. CSI-RS Resource-Based Hierarchical Beam Grouping

For hierarchical beam grouping based on CSI-RS resources, a primary beam and a secondary beam may be defined. The primary beam may correspond to an MRS. Further, the primary beam may correspond to a CSI-RS resource. The secondary beam may correspond to a CSI-RS port. For example, the CSI-RS port corresponding to the secondary beam may be distinguished from a legacy LTE CSI-RS port. The LTE CSI-RS port may be of CSI-RS port type I, whereas the CSI-RS port of the secondary beam may be of CSI-RS port type I. However, the following description is given with the appreciation that a CSI-RS port is of CSI-RS port type II. Further, a port defined for abeam may refer to a CSI-RS port, although under a different name from CSI-RS port, and thus is not limited to any particular name.

Further, in relation to hierarchical beam grouping, the primary beam may correspond to a wide beam or rough beam, and the secondary beam may correspond to a narrow beam or fine beam. The secondary beam may be included in the primary beam, and one or two CSI-RS ports may correspond to one secondary beam. Further, two or more CSI-RS ports may correspond to one secondary beam, and the present disclosure is not limited to this embodiment. That is, the primary beam covers a wider area than the secondary beam, and a beam for a narrower area may be specified by the secondary beam.

More specifically, the eNB may determine CSI-RS resources by the primary beam. The eNB may define a group of secondary beams belonging to the primary beam (or the same MRS). That is, the secondary beams may be included in the primary beam. The secondary beams may belong to the same CSI-RS resource and may be distinguished by CSI-RS ports, as described before. Further, in relation to CSI content, legacy CSI may include a CRI, a rank indicator (RI), a precoding matrix indicator (PMI), and a channel quality indicator (CQI). If the CSI content is still used for beam management, the CRI may correspond to a CSI-RS resource, not to the primary beam.

Figure 9:
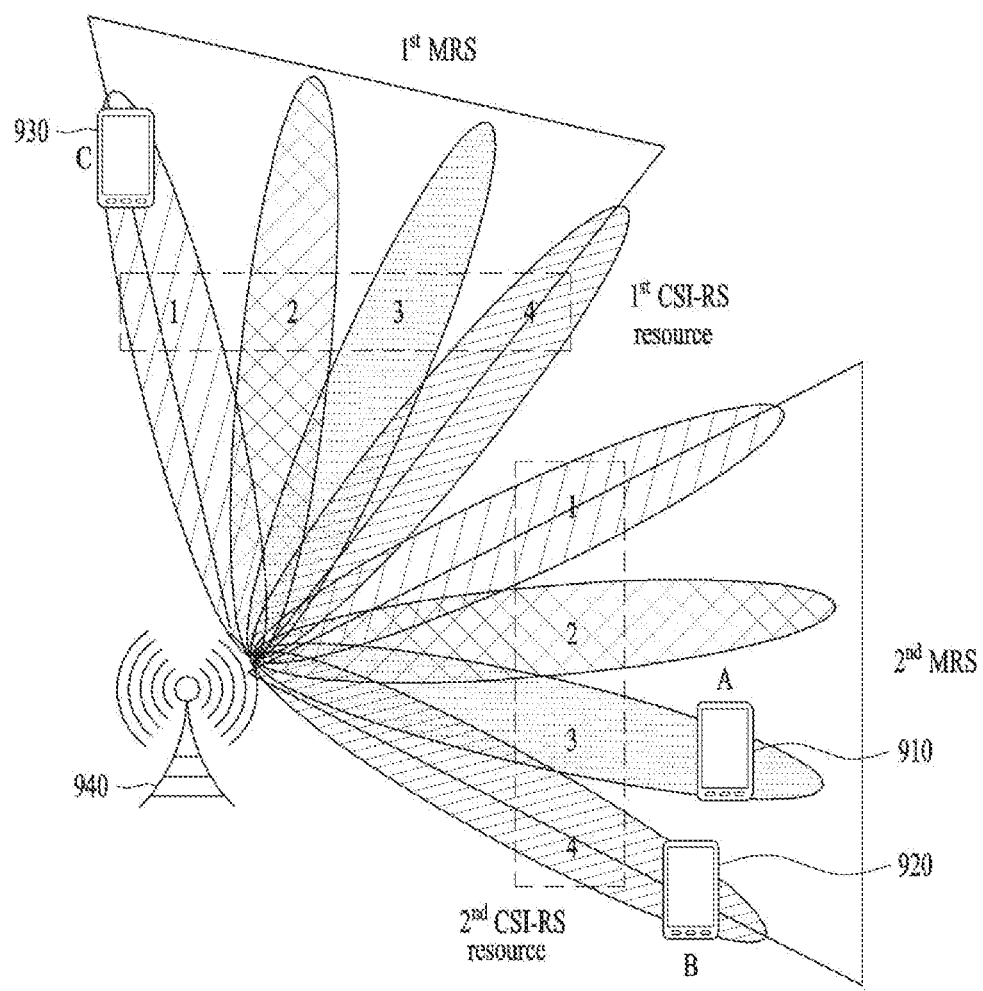
FIG. 9 is a diagram illustrating primary beams and secondary beams in a communication system using mmWave.

Referring to FIG. 9, for example, an eNB 910 may form two primary beams (MRSs). A first primary beam (or first MRS) and a second primary beam (or second MRS) may cover areas in different directions. The first primary beam may be configured with a first CSI-RS resource, and the second primary beam may be configured with a second CSI-RS resource. That is, the two primary beams may be distinguished from each other by different CSI-RS resources. For example, one primary beam may be divided into four secondary beams. Each of the secondary beams is a narrow beam included in the primary beam, and may be distinguished by a CSI-RS port. That is, the secondary beams have the same CSI-RS resource, but different CSI-RS ports. UE A 910, UE B 920, and UE C 930 may correspond to different primary and secondary beams, respectively based on beamforming, which will be described below.

Figure 10:
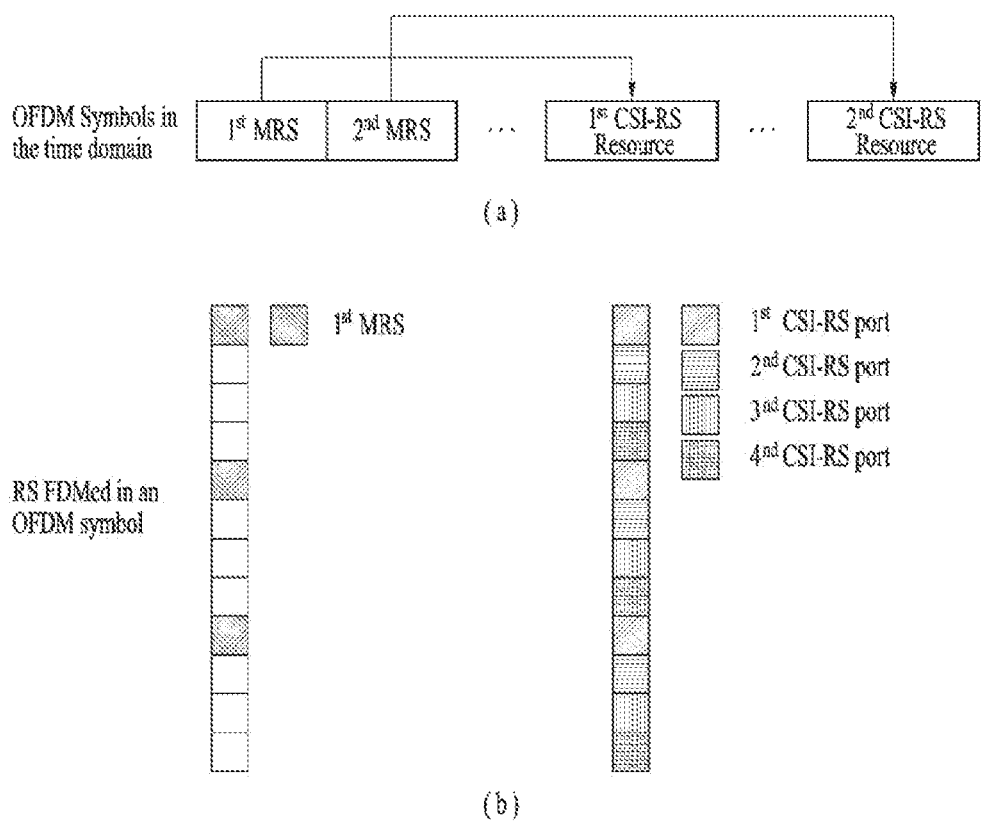
FIG. 10 is a diagram illustrating a method of allocating measurement reference signals (MRSs) and CSI-RS resources in the time and frequency domains.

FIG. 10 is a diagram illustrating transmission of an MRS (or SS block) and a CSI-RS in the time domain. Referring to FIG. 10(a), each block may represent one OFDM symbol or a set of OFDM symbols. Each MRS may be mapped to a CSI-RS resource. CSI-RS resources as primary beams and CSI-RS ports as secondary beams may be mapped in FDM, as illustrated in FIG. 10(b). That is, the primary beams may be allocated apart from each other by a predetermined spacing in the frequency domain. Further, the secondary beams may be allocated, distinguished by CSI-RS ports in one OFDM symbol. Herein, a CSI-RS resource indication may be possible on an OFDM symbol basis. However, the drawing is merely an example, and it is also possible to set different numbers of primary beams and secondary beams and map the primary and secondary beams.

In another example, referring to FIG. 11, one CSI-RS resource may be mapped to a plurality of OFDM symbols. For example, FIG. 11(a) may illustrate the time-domain mapping relationship between MRSs and CSI-RS resources, as described before. CSI-RS resources may be allocated in TDM in a plurality of OFDM symbols. For example, referring to FIG. 11(b), it may be noted that CSI-RSs each include 8 antenna ports and are TDMed in different OFDM symbols. The number of antenna ports may be set to a different value, not limited to 8.

On the part of the UE, an actual beam used by the UE may be defined by "{CSI-RS resource, CSI-RS port}". For example, in FIG. 9, UE A 910, UE B 920, and UE 3 930 may exist. UE C 930 may determine a primary beam by a first MRS, and determine a first CSI-RS resources by the first MRS. A secondary beam may be determined by a CSI-RS port belonging to the first CSI-RS resource. Further, UE A 910 and UE B 930 may also determine primary and secondary beams in the same manner. Based on FIG. 9, a beam used for each UE may be defined as illustrated in Table 4.

TABLE 4

UE A = (2nd CSI-RS resource, 3rd CSI-RS port)
UE B = (2nd CSI-RS resource, 4th CSI-RS port)
UE C = (1st CSI-RS resource, 1st CSI-RS port)

Further, for example, a primary beam of each UE may be specified by an MRS, as illustrated in Table 5 below. In the foregoing embodiment, primary beams and CSI-RS resources may be mapped in a 1:1 correspondence. While the term MRS is used herein, an MRS may be expressed as a CSI-RS. That is, the MRS may be a CSI-RS. While the following description is given in the context of an MRS, the present disclosure is not limited to the term MRS and the MRS may be replaced with the CSI-RS.

TABLE 5

UE A = (2nd MRS)
UE B = (2nd MRS)
UE C = (1st MRS)

Figure 12:
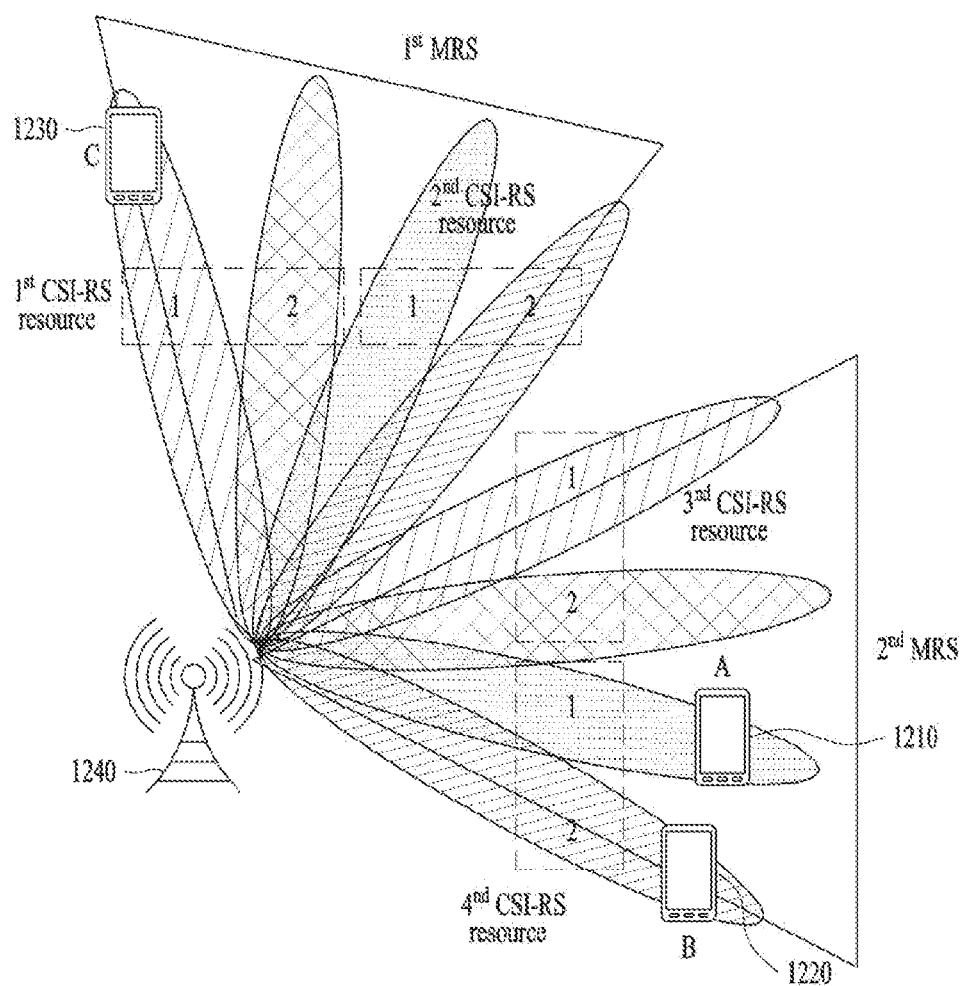
FIG. 12 is a diagram illustrating a method of allocating a plurality of CSI-RS resources to a primary beam.

In another example, referring to FIGS. 12 and 13, a primary beam may be defined by two CSI-RS resources. Referring to FIGS. 12 and 13, a first MRS may be mapped to first and second CSI-RS resources in the time domain. Further, a second MRS may be mapped to third and fourth CSI-RS resources in the time domain. That is, each primary beam may be defined by two CSI-RS resources. For example, a secondary beam may be defined by a CSI-RS port, and the present disclosure is not limited to this embodiment.

More specifically, referring to FIGS. 12 and 13, beams used by UEs 1210, 1220, and 1230 may be defined as illustrated in Table 6.

TABLE 6

UE A = (4th CSI-RS resource, 1st CSI-RS port)
UE B = (4th CSI-RS resource, 2nd CSI-RS port)
UE C = (1st CSI-RS resource, 1st CSI-RS port)

Further, for example, the primary beam for each of the UEs 1210, 1220, and 1230 may be specified by an MRS, as illustrated in Table 7. In the above embodiment, primary beams may be mapped to CSI-RS resources in a 1:2 correspondence. Further, while the term MRS is used herein, MRS is interchangeably used with CSI-RS, and the above embodiment should not be construed as limiting the present disclosure. As described above, secondary beams may be identified by CSI-RS ports and allocated in FDM, which should not be construed as limiting the present disclosure.

TABLE 7

UE A = (2nd MRS)UE B = (2nd MRS)UE C = (1st MRS)

As described above, a primary beam may be mapped to CSI-RS resources in a 1:1 or 1:N correspondence. If a primary beam is mapped to CSI-RS resources in a 1:N correspondence, a plurality of CSI-RS resources may exist in the primary beam, as described before. For example, if there are N secondary beams and there are M CSI-RS ports, N/M CSI-RS resources may be defined. That is, in order to represent beams in consideration of the number of secondary beams and the number of CSI-RS ports, a plurality of CSI-RS resources may be defined. If the number of primary beams distinguishable by MRSs is Q where Q=N/M, one to one mapping may be performed. On the other hand, if the number of primary beams is "Q<N/M", one to N mapping may be required, which should not be construed as limiting the present disclosure.

2-2. CSI-RS Resource Configuration for Beam Management

Now, a description will be given of a CSI-RS resource configuration for beam management. In the following description, a slot may be a minimum scheduling unit. A slot may include one or more consecutive OFDM symbols, conceptually identical to an LTE subframe. The present disclosure is not limited to this embodiment.

Figure 14:
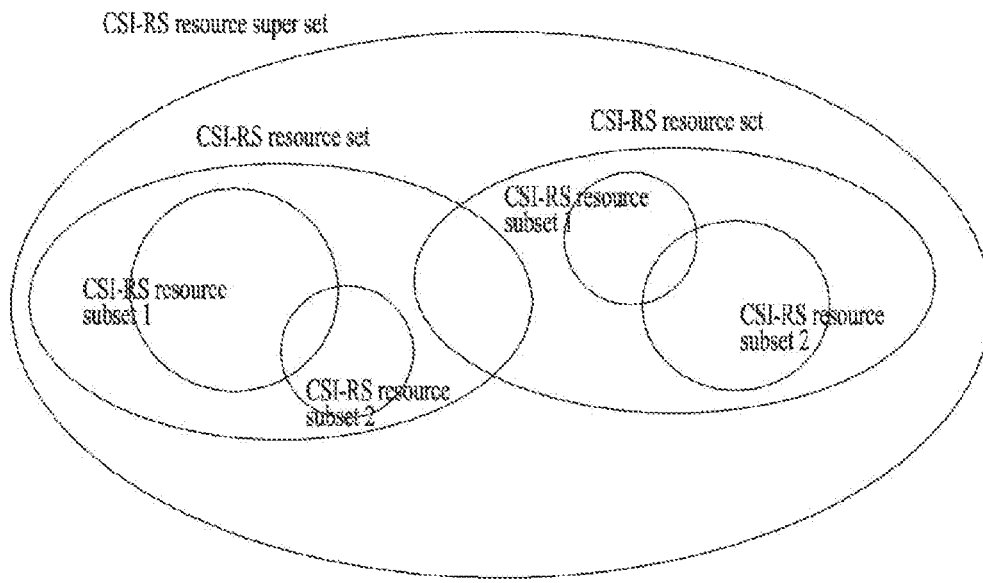
FIG. 14 is a diagram illustrating a beam configuration method.

For example, CSI-RS resources may form a CSI-RS resource set. As illustrated in FIG. 14, a CSI-RS resource superset, a CSI-RS resource set, a CSI-RS resource subset, and a CSI-RS resource may be configured. Their mutual inclusion relation is given in [Equation 13].

$$CSI\text{-}RS \text{ resource superset} > CSI\text{-}RS \text{ resource set} > CSI\text{-}RS \text{ resource subset} > CSI\text{-}RS \text{ resource} \quad [\text{Equation 13}]$$

That is, the CSI-RS resource superset may be the largest category. CSI-RS resource sets may be included in the CSI-RS resource superset. Each CSI-RS resource set may include CSI-RS resource subsets each including CSI-RS resources, as illustrated in FIG. 14.

More specifically, the CSI-RS resource superset may be all CSI-RS resources available for a TRP. A CSI-RS resource superset may be basically defined as one or more TRPs. Further, a CSI-RS resource set may be one or more CSI-RS resource groups configured for each UE by a TRP. A CSI-RS resource subset may be a CSI-RS resource group that the TRP activates in the CSI-RS resource set configured for the UE. For example, when beam management is performed based on a CSI-RS resource subset, the UE may perform measurement and reporting based on the CSI-RS resource subset.

Figure 15:
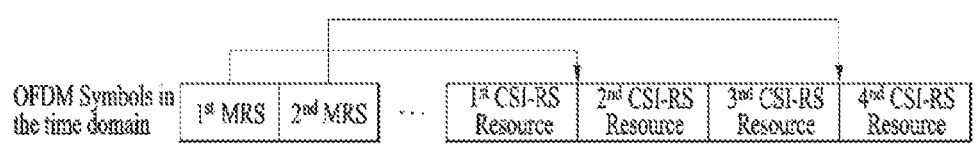
FIG. 15 is a diagram illustrating a method of allocating MRSs and CSI-RS resources in the time domain.

For example, FIG. 15 may illustrate a CSI-RS resource set-based operation method. More specifically, the eNB may configure the UE with one or more CSI-RS resources of a CSI-RS resource set by at least one of RRC signaling or DCI. That is, the eNB may configure a UE-dedicated CSI-RS resource set for each UE.

For example, each CSI-RS resource may be configured at a time position. For example, referring to FIG. 15, CSI-RS resources may be configured as described in Table 8.

TABLE 8

CSI-RS resource #1: OFDM symbol #11 CSI-RS resource #2: OFDM symbol #12CSI-RS resource #3: OFDM symbol #13 CSI-RS resource #4: OFDM symbol #14

Figure 16:
FIG. 16 is a diagram illustrating a method of allocating MRSs and CSI-RS resources in the time domain.

In another example, referring to FIG. 16, a CSI resource may be configured at a time position in a slot. For example, CSI-RS resources may be configured separately in odd-numbered and even-numbered slots, as illustrated in Table 9.

TABLE 9

CSI-RS resource #1 : OFDM symbol #11 for odd slot CSI-RS resource #2 : OFDM symbol #12 for odd slot CSI-RS resource #3 : OFDM symbol #11 for even slot CSI-RS resource #4 : OFDM symbol #12 for even slot The present disclosure is not limited to the foregoing embodiments, and other embodiments are also available. In the above embodiment, it is necessary to additionally preset a transmission periodicity. For example, the process in the above embodiment may lead to large control information. Accordingly, the transmission periodicity may be configured by RRC signaling, instead of DCI.

Then, if CSI-RS resource subsets have been defined, the eNB may indicate to the UE a CSI-RS resource subset to be activated in the CSI-RS resource set configured for the UE. That is, the eNB may determine a CSI-RS resource to be used from among the CSI-RS resources of the CSI-RS resource set configured for the UE.

Figures 17, 18:
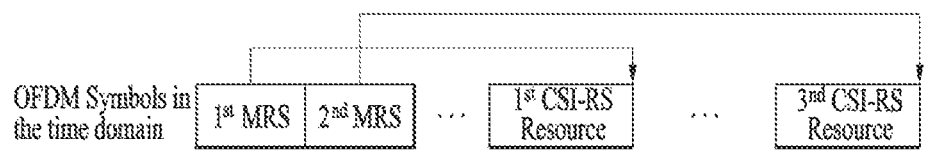
FIG. 17 is a diagram illustrating a method of allocating MRSs and CSI-RS resources in the time domain.
FIG. 18 is a diagram illustrating a method of repeatedly allocating a CSI-RS resource.

That is, if the eNB uses a CSI-RS resource subset, the eNB may provide information about the CSI-RS resource subset to the UE. However, if CSI-RS resource subsets are not defined, the eNB may skip this process. Herein, the terms CSI-RS resource set and CSI-RS resource subset may be used in the same meaning. For example, referring to FIG. 17, only a first CSI-RS resource (CSI-RS resource #1) and a third CSI-RS resource (CSI-RS resource #3) may be activated. If the concept of CSI-RS resource subset is used as described before, CSI-RS resource #1 and CSI-RS resource #3 may be CSI-RS resource subsets.

For example, the UE may report its preferred CSI-RS resource index to the eNB. If the UE reports the preferred CSI-RS resource index based on a CSI-RS resource set, the UE may transmit the report by 2-bit information (#1 to #4). On the other hand, if the UE reports the preferred CSI-RS resource index based on a CSI-RS resource subset, the UE may transmit the report by 1-bit information (#1 and #2). That is, the number of bits for representing information may be different depending on whether reporting is performed at a CSI-RS resource set level or a CSI-RS resource subset level. The present disclosure is not limited to this embodiment.

For example, since one or more CSI-RS resources are selected from a predetermined CSI-RS resource set in the above process, the size of control information may be small. Accordingly, the UE may need a dynamic configuration in order to minimize feedback overhead and measurements. Therefore, the above process may be configured by at least one of MAC signaling or DCI. The present disclosure is not limited to this embodiment.

2-3. Aperiodic CSI-RS Resource Configuration Procedure

In mmWave, an eNB and a UE may perform a beam management procedure. Herein, P1, P2 and P3 may be defined. In P2, DL Tx beams of the eNB may be swept, while an Rx beam of the UE may be fixed. The UE may select the best of the swept Tx beams of the eNB. The UE may then report the selected beam to the eNB. That is, P2 may be a procedure performed during beam sweeping at the eNB, and a beam may be configured in this procedure. In P3, the eNB may repeatedly transmit a DL Tx beam in the same direction, while the UE sweeps Rx beams. The UE may select the best of the swept Rx beams, thereby performing beam management.

To support the P2 and P3 operations, CSI-RS resources may be configured aperiodically. For example, when the eNB sweeps Tx beams in P2, different CSI-RS resources may be repeatedly transmitted as illustrated in FIG. 15(*a*). That is, the eNB may repeatedly transmit the CSI-RS resource of each available Tx beam in the time domain.

In P3, when the UE sweeps Rx beams, the eNB may repeatedly transmit the same CSI-RS resource as illustrated in FIG. 15(*b*). Herein, the eNB may repeatedly transmit one CSI-RS resource along the time axis in a specific direction. For example, FIG. 18(*b*) illustrates repeated transmissions of a first CSI-RS resource.

For CSI-RS resource transmissions for the P2 and P3 operations, a configuration may be required, which will be described below.

2-3-1. CSI-RS Resource Configuration for P3

When CSI-RS resources are transmitted for the above-described P3 operation, at least one of the index of a CSI-RS resource to be repeatedly transmitted, the starting point of the CSI-RS resource transmission in a slot, a time-domain offset, a cell ID, a transmission period, or the ending point of the CSI-RS resource transmission needs to be configured.

In another example, a repetition number may be defined. The starting point of a CSI-RS resource transmission and the repetition number may be configured. In this case, information about the ending point of the CSI-RS resource transmission may not be needed.

Further, for example, a CSI-RS port index may be configured. For example, in the case where all CSI-RS ports corresponding to the CSI-RS resource are shown, it may not be necessary to separately define the CSI-RS index. That is, there is no need for configuring the CSI-RS index.

Figure 19:
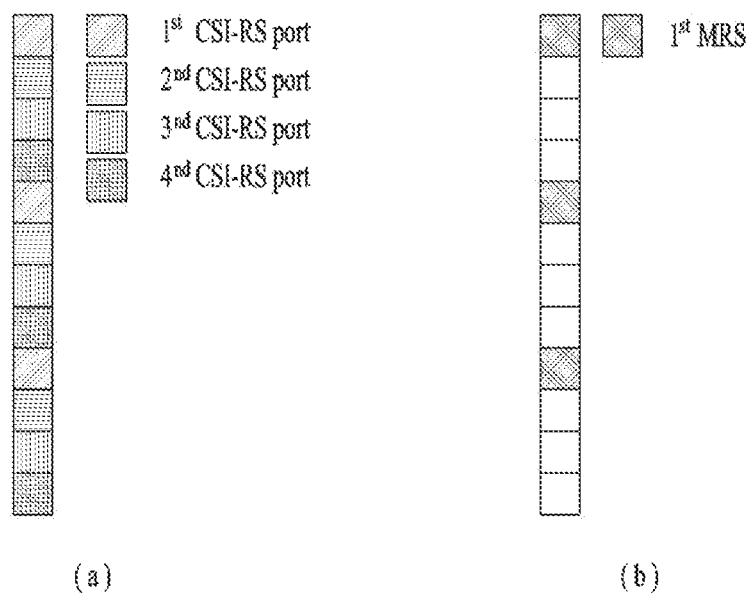
FIG. 19 is a diagram illustrating a method of allocating a CSI-RS port.

However, if only a specific CSI-RS port is shown by a specific beam, it is necessary to configure a CSI-RS port index. For example, if a specific secondary beam is shown as a specific CSI-RS port as illustrated in FIG. 19(a), a CSI-RS port index may be configured and only the beam corresponding to the configured CSI-RS port index may be transmitted repeatedly. On the contrary, if a primary beam is shown irrespective of a CSI-RS port as illustrated in FIG. 19(b), there is no need for configuring a CSI-RS port index. For example, a field carrying information about the CSI-RS port may be separately defined in at least one of an RRC signal or DCI. However, if there is no need for configuring a CSI-RS port index as described above, the field may be used for any other purpose, and the present disclosure is not limited to this embodiment.

In another example, there is a need for further defining a cell ID in relation to a CSI-RS resource configuration for P3. Information about the sequence of a corresponding CSI-RS may be determined based on the cell ID of a serving TRP or another TRP, and the present disclosure is not limited to this embodiment.

2-3-1-1. CSI-RS Resource Configuration Based on DCI

In relation to the above CSI-RS resource configuration, at least one of a CSI-RS resource index, a starting point, an ending point, a repetition number, a CSI-RS port index, or a cell ID may be indicated to the UE. For example, when the repetition number is indicated, information about the ending point may not be needed, as described before. The CSI-RS port index or the cell ID may be indication optionally, only when needed, as described before. For example, when the UE receives DCI including a cell ID, the UE may regard a cell corresponding to the cell ID as a serving cell, and may not report separately to the eNB.

2-3-1-2. CSI-RS Resource Configuration Based on RRC and DCI

Part of the above information may be configured by RRC signaling inconsideration of overhead, and information may be selected from the configured information by DCI. Accordingly, signaling overhead may be minimized.

More specifically, at least one of a repetition number or a cell ID may be preconfigured by RRC signaling. For example, the configuration may be performed by indexing multiple combinations of cell IDs and repetition numbers.

For example, the indexing may be performed in the manner described in Table 10. However, Table 10 is a merely exemplary and thus should not be construed as limiting.

TABLE 10

1=(Cell ID=1234, # of repetitions = 4),
2=(Cell ID=1235, # of repetitions = 4),
3=(Cell ID=1236, # of repetitions = 4),
4=(Cell ID=1237, # of repetitions = 4)

For example, a repetition number may depend on the characteristics of the UE. That is, the UE detects the best beam by sweeping Rx beams. The repetition number may be determined according to the characteristics of the UE Rx beams. For example, once the repetition number is determined, the repetition number may not be changed. Therefore, information about the repetition number may be configured for the UE by RRC signaling, and the present disclosure is not limited to this embodiment.

Further, for example, a cell ID may be large in the number of bits, as described in Table 10 above. Therefore, it may be inappropriate to indicate the cell ID by DCI. Thus, the cell ID may be preconfigured by RRC signaling, and the present disclosure is not limited to this embodiment.

Herein, at least one of the starting point of a CSI-RS resource index, the ending point of the CSI-RS resource index, a port index, or indexes preconfigured by RRC signaling may be indicated to the UE by DCI. As described before, knowledge of a repetition number may obviate the need for information about the ending point. Further, if all of CSI-RS ports are shown, the port index may not be needed, as described before.

Further, the DCI may include information indicating a value to be selected from among the indexes preconfigured by RRC signaling. For example, if information indicating selection of value 4 in Table 10 is included in the DCI, the cell ID may be determined to be "Cell ID=1237" and the repetition number may be determined to be "# of repetitions=4".

In another example, if the repetition number is not configured by RRC signaling, the DCI may indicate the ending point as described before.

Figure 20:
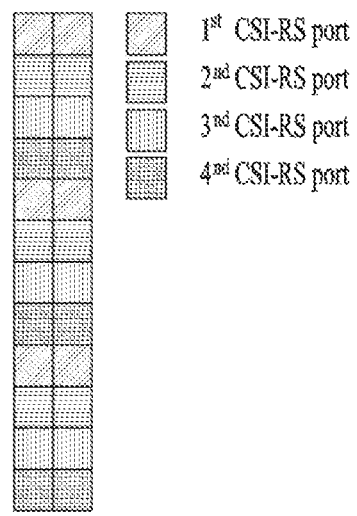
FIG. 20 is a diagram illustrating a method of repeatedly allocating a CSI-RS resource.

In another example, a repetition number may be defined as a CSI-RS resource parameter. For example, referring to FIG. 20, a parameter for a repetition number may be set to 2. In FIG. 20, one CSI-RS resource may be defined as two repetitions of the same CSI-RS port, not two repetitions of the same CSI-RS resource. However, the repetition number may be set to a different value as a parameter. Further, for example, the repetition number may be used as a parameter indicating the repetition number of a CSI resource, as described before.

Further, for example, after the eNB defines a CSI-RS resource by RRC signaling for the UE, the eNB may configure information about a repetition number by at least one of RRC signaling or DCI, and the present disclosure is not limited to this embodiment.

2-3-2. CSI-RS Resource Configuration for P2

A CSI-RS resource configuration may be required for P2. That is, while the eNB transmits a signal by changing Tx beams, the UE may perform beam management by an Rx beam. For example, all or part of the afore-described CSI-RS resource configuration information for P3 may be defined and indicated by the CSI-RS resource configuration for P2.

For example, at least one of the starting point of a CSI-RS resource in a slot, the ending point of the CSI-RS resource in the slot, a CSI-RS port index, a cell ID, or a repetition number may be defined and indicated. For example, the cell ID may be the cell ID of a serving TRP or another TRP.

Further, for example, if the P2 operation is enabled, only a CSI-RS resource subset may be transmitted. Therefore, CSI-RS resource subset information or new CSI-RS resource subset information may be defined and indicated, and the present disclosure is not limited to this embodiment. However, when only the CSI-RS resource subset is transmitted, it is not necessary configure the UE with information about the CSI-RS resource subset. If a new CSI-RS resource is to be configured in addition to the CSI-RS resource subset, the eNB may configure information about the new CSI-RS resource by at least one of RRC signaling or DCI. For example, the configuration may be performed by RRC signaling in consideration of the size of the configuration information, and the present disclosure is not limited to this embodiment.

2-3-2-1. CSI-RS Resource Configuration Based on DCI

In relation to the P2 operation, CSI-RS resource configuration information may be indicated by DCI. For example, the afore-described information about the starting point and the ending point may be indicated by DCI. Further, the UE may regard the cell ID as that of a serving cell, and may not separately transmit information about the cell ID to the eNB.

Further, the eNB may separately indicate CSI-RS resource indexes to be transmitted in a CSI-RS resource subset. In another example, if the DCI does not carry information about the CSI-RS resource indexes, the eNB may sequentially transmit information about total CSI-RS resource subsets. As such, the eNB may transmit beams by changing Tx beams.

2-3-2-2. CSI-RS Resource Configuration Based on RRC and DCI

In consideration of overhead, part of the above information may be configured by RRC signaling, and information may be selected from the configured information by DCI. Accordingly, signaling overhead may be minimized.

More specifically, at least one of a CSI-RS resource subset a cell ID may be preconfigured by RRC signaling. For example, the configuration may be performed by indexing multiple combinations of cell IDs and CSI-RS resource subsets.

For example, the indexing may be performed in the manner described in Table 11. However, Table 11 is a merely exemplary and thus should not be construed as limiting.

TABLE 11

1=(CSI-RS resource subset =3, Cell ID=1233)
2=(CSI-RS resource subset=5, Cell ID=1234)

Further, for example, a cell ID may be large in the number of bits, as described in Table 11 above. Therefore, it may be inappropriate to indicate the cell ID by DCI. Thus, the cell ID may be preconfigured by RRC signaling, and the present disclosure is not limited to this embodiment.

Herein, at least one of the starting point, the ending point, the port index, or indexes preconfigured by RRC signaling may be indicated to the UE by DCI. Further, the DCI may include information indicating a value to be selected from among the indexes preconfigured by RRC signaling. For example, if information indicating selection of value 2 in Table 11 is included in the DCI, the cell ID may be determined to be "Cell ID=1234" and the CSI-RS resource subset may be determined to be "CSI-RS resource subset=5".

In another example, CSI-RS resources may be defined in the CSI-RS resource subset, and the number of CSI-RS resources may also be predetermined. Accordingly, information about the ending point may not be needed and thus may be omitted. Further, for example, the CSI-RS port index may also be omitted. If the CSI-RS port index is omitted, all CSI-RS ports of the CSI-RS resource may be shown to the UE, and the present disclosure is not limited to this embodiment.

In another example, a DCI field indicating whether an aperiodic CSI-RS configuration of DCI is for beam management or CSI acquisition may be defined. Thus, the DCI operation may be distinguished from a legacy DCI operation, and the present disclosure is not limited to this embodiment.

2-4. Method of Reporting Primary Beam and Secondary Beam, Respectively 2-4-1. Primary Beam Reporting Method As described before, beam management may be performed based on CSI-RS resources. For example, beam management information may be beam state information (BSI). BSI may refer to information about an afore-mentioned preferred primary beam and an RSRP related to the primary beam. There may exist a need for a method of feeding back BSI to the eNB and detecting a primary beam and a secondary beam by the UE, which will be described below.

More specifically, a primary beam may be detected based on an MRS, as described before. That is, the UE may acquire one or more primary beams from an MRS. For example, the MRS may be a CSI-RS. That is, the MRS may be a CSI-RS used for beam management. The following description is given in the context of an MRS, to which the present disclosure is not limited, and the MRS may be interpreted as a CSI-RS.

After the UE acquires the one or more primary beams, the UE may feed back information about the primary beams to the eNB. That is, the UE may feed back BSI to the eNB. The UE may feed back preferred primary beams to the eNB on at least one of a random access channel (RACH), a MAC-CE, a UL data channel (e.g., PUSCH), or a UL control channel (e.g., PUCCH). That is, the UE may provide information about the preferred primary beams to the eNB in various manners.

2-4-1-1. Feedback Method Via RACH

For example, the UE may feedback preferred beam information to the eNB in a RACH procedure. More specifically, the UE may report one or more preferred primary beams and BSI of the primary beams to the eNB by an RRC connection request during initial access to the eNB. That is, the UE may include and transmit preferred primary beam information to the eNB. However, since the RACH procedure is performed in a contention-based manner, collision may occur and thus a strict latency requirement may be required. Further, for example, reporting through the RACH procedure may be aperiodic reporting triggered by the UE.

That is, the UE may feed back preferred primary beam information to the eNB in the RACH procedure, and the present disclosure is not limited to this embodiment.

2-4-1-2. Feedback Method in MAC-CE or UL Data Channel

In another example, if the signal strength measurement of an MRS is less than a threshold, the UE may transmit an SR to the eNB. The threshold may be a predetermined reference value and set to a different value. The eNB may allocate a UL message for UL transmission to the UE. The UE may report BSI in an L3 message of the UL message. For example, this may be an L3 operation, in which although much information is reported, latency may occur. For example, an RRC message may be used as the L3 message, and the present disclosure is not limited to this embodiment.

In another example, the UE may report BSI in a MAC-CE of the allocated UL message to the eNB. The operation of transmitting BSI in a MAC-CE is carried out in the MAC and thus may be an L2 operation.

In another example, the UE may multiplex the allocated UL message with BSI, for transmission. That is, this is a physical layer operation in which the BSI may be transmitted based-on an L2 operation. This operation may be fastest. That is, the UE may perform aperiodic reporting in a UL message allocated by the eNB according to the SR. Herein, the UE may transmit the BSI based on at least one of the L3, L2 or L1 operation for the allocated UL message, and the present disclosure is not limited to this embodiment.

2-4-1-3. PUCCH-Based

The UE may report beam management information on a UL control channel to the eNB. For example, the UE may report at least one of a preferred CSI-RS resource, a CSI-RS port, or BSI on a PUCCH to the eNB. However, since PUCCH information has a small number of feedback bits, the UE may set the number of primary beams to be reported to 1 or a small number. The number of reportable beams may be configured by the eNB. Further, for example, the UE may report only the index of a preferred primary beam on a PUCCH, without transmitting the RSRP of the primary beam. That is, the UE may report only part of BSI on the PUCCH.

In another example, a field that distinguishes preferred primary beam information from a preferred CSI-RS resource transmission may be defined in a PUCCH field. Further, for example, a field that distinguishes preferred primary beam information from a CSI-RS port may be defined in a PUCCH field.

Further, for example, considering that the PUCCH has a small number of feedback bits, the eNB may allocate a PUSCH resource to the UE, and the UE may report BSI in the allocated PUSCH resource. The UE may not report a primary beam on the PUCCH. That is, the UE may only request a reconfiguration of a CSI-RS resource set via the PUCCH, and report BSI via the PUSCH to the eNB.

In another example, if the UE reports the preferred primary beam on the PUCCH, the eNB may reconfigure at least one of a CSI-RS resource set or a CSI-RS resource subset for the UE.

In another example, the UE may not be allocated a UL resource separately through an SR. Instead, the UE may perform beam management in periodically transmitted PUCCH resources. In this manner, only when beam management is required, the eNB may request reporting to the UE. Further, for example, if a PUCCH period is short, beam information may be reported faster than on an RACH, a MAC-CE, or a UL data channel. That is, this may be efficient, if the UE's location is frequently changed or the UE's movement is taken into account.

As described above, the use of the PUCCH enables support of both of periodic reporting and aperiodic reporting. That is, as described above, the UE may directly report BSI on the PUCCH. Further, the UE may aperiodically report BSI on the PUCCH, only when a problem occurs to beam management, and the present disclosure is not limited to this embodiment.

A primary beam may be reported faster in the order of PUCCH (L1), MAC CE (L2), control message (L3), and RACH. That is, the primary beam may be reported fastest on the PUCCH in which beam reporting is performed by multiplexing control information and data information (L1). In contrast, the primary beam may be reported most slowly on the RACH that operates in a contention-based manner. The present disclosure is not limited to this embodiment.

2-4-2. Secondary Beam Reporting Method

The UE may report preferred secondary beam information to the eNB. That is, a secondary beam may correspond to a CSI-RS port as described above, and the UE may report a preferred CSI-RS port to the eNB. The UE may report the preferred CSI-RS port to the eNB based on a CSI-RS resource subset. For example, the UE may acquire one or more preferred CSI-RS ports by using a configured CSI-RS resource subset. The UE may report the preferred CSI-RS ports (or CSI-RS resources) to the eNB on at least one of a UL control channel (e.g., PUCCH) or a UL data channel (e.g., PUSCH).

For example, in the case where the UE performs reporting via the PUCCH the same method as used for reporting about both of a primary beam and a secondary beam on the PUCCH may be applied. This method will be described below and may be applied in the same manner.

In another example, in the case where the UE performs reporting via the PUSCH the same method as used for reporting about both of a primary beam and a secondary beam on the PUCCH may be applied. This method will be described below and may be applied in the same manner.

Further, for example, a secondary beam may correspond to a CSI-RS port. Therefore, when a secondary beam is reported, both of information about a CSI-RS resource index and a CSI-RS port index need to be included in reporting information (or content). In the case where a plurality of CSI-RS resources are configured for the UE, only when the UE transmits both of a CSI-RS resource index and a CSI-RS port index to the eNB, the eNB may determine UE-preferred secondary beam information.

2-5. Method of Reporting Primary Beam and Secondary Beam Together

The UE may report beam management information on a UL control channel. For example, the UE may report beam management information on the PUCCH. However, when the UE feeds back beam management information on a channel limited in the number of feedback bits, such as the PUCCH, content needs to be minimized or the number of feedback bits for each piece of content needs to be minimized.

More specifically, the UE may index only configured CSI-RS resources. That is, the UE may perform reporting by using CSI-RS resource indexes defined within a CSI-RS resource subset as an activated CSI-RS resource set. Herein, the UE reports only an index, thereby reducing the number of feedback bits.

In a specific embodiment, the CSI-RS resources of the CSI-RS resource subset may be indexed from #1 to #14. For example, it may be assumed that CSI-RS resource #2 and CSI-RS resource #14 has been configured for the UE. If the UE prefers CSI-RS resource #2, the UE may report the preferred CSI-RS resource as #1. Further, if the UE prefers CSI-RS resource #14, the UE may report the preferred CSI-RS resource as #2. That is, the UE may perform reporting by indexing the configured CSI-RS resources.

In another example, if the UE is configured with only one CSI-RS resource, a CSI-RS index may be omitted.

In another example, when the UE transmits a feedback on a channel limited in the number of feedback bits, such as the PUCCH, the UE may report only a CSI-RS port index. The eNB may consider the feedback CSI-RS port index as indicating the same CSI-RS resource as a current CSI-RS port configured for the UE. That is, the UE may perform beam management simply by reporting the CSI-RS port index.

In another example, a CSI-RS resource index and a CSI-RS port index may be transmitted with different transmission periods. As described above, the CSI-RS resource index may correspond to a primary beam, and the CSI-RS port index may correspond to a secondary beam. The primary beam may be changed more slowly than the secondary beam. That is the primary beam may change less than the secondary beam. Accordingly, the CSI-RS resource index may be reported with a long period, whereas the CSI-RS port index may be reported with a short period. That is, the reporting period of the CSI-RS resource index may be longer than the reporting period of the CSI-RS port index. For example, these two periods may be determined without overlap between them.

If the reporting of the CSI-RS resource index overlaps with the reporting of the CSI-RS port index, the CSI-RS resource index with a long reporting period may be reported with priority. Further, index reporting may lead to reduction of the number of feedback bits, and the above reporting may be set to periodic CSI-RS reporting. For example, if the eNB requests aperiodic reporting to the UE, the eNB may allocate a reporting resource to the UE. For example, the eNB may allocate a data channel such as the PUSCH to the UE. Herein, the UE may report one or more preferred CSI-RS resource indexes and one or more preferred CSI-RS port indexes for each CSI-RS resource.

2-6. CSI-RS Resource Update

Figure 21:
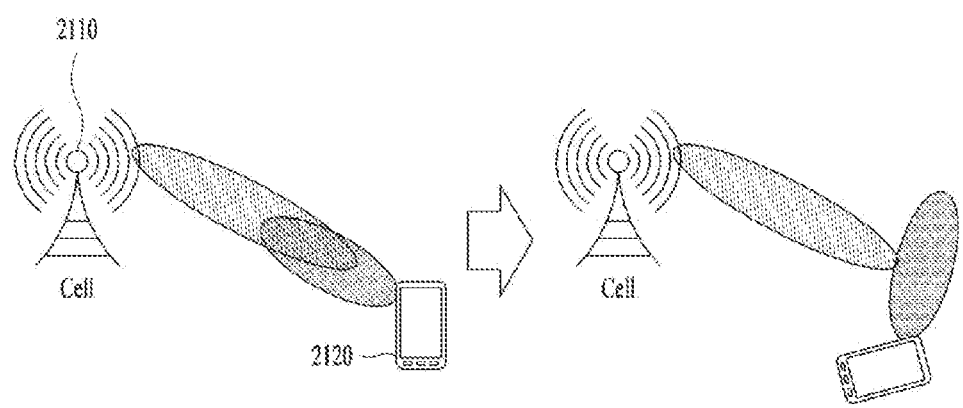
FIG. 21 is a diagram illustrating a situation requiring beam recovery.

A beam between a UE and an eNB needs to be changed in view of movement of the UE 2210 or an obstacle. The beam may be adjusted in a beam refinement or beam recovery procedure. For example, referring to FIG. 21, even though a Tx beam of the eNB 2110 is maintained, if an Rx beam of the UE 2120 is changed, beam refinement or beam recovery may be required. In another example, even though the Rx beam of the UE 2120 is maintained, if the Tx beam of the eNB 2110 is changed, beam refinement or beam recovery may be required. Further, if both of the Rx beam of the UE 2120 and the Tx beam of the eNB 2110 are changed, beam refinement or beam recovery may be required. That is, once a beam between the UE 2120 and the eNB 2110 is changed, beam refinement or beam recovery may be required.

Figure 22:
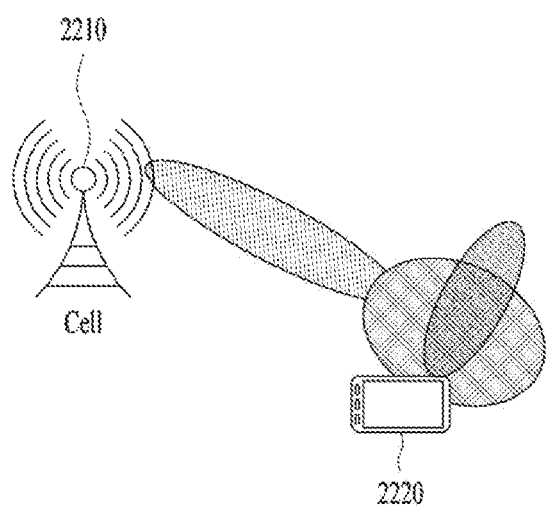
FIG. 22 is a diagram illustrating a situation requiring beam recovery.

For example, referring to FIG. 22, the UE 2220 may measure the RSRPs of a wide beam and a narrow beam, compare the RSRPs, and then determine whether to change a UE Rx beam. For example, if the RSRP of the wide beam is larger than the RSRP of the narrow beam, the UE 2220 may change the Rx beam. That is, if the RSRP of the wide beam is larger than the RSRP of the narrow beam in a situation in which the narrow beam is used in consideration of an mmWave environment, the direction of the beam may be wrong. Accordingly, the UE 2120 may change the Rx beam. On the contrary, if the RSRP of the wide beam is less than the RSRP of the narrow beam, the UE may maintain the Rx beam.

Further, a description will be given of a configuration for changing or updating a CSI-RS resource in relation to the afore-described beam or change.

When a problem occurs to a primary beam of the UE, when the UE detects a better primary beam, or when the UE fails to detect a secondary beam, the UE may change a CSI-RS resource. More specifically, if the radio resource management (RRM) measurement of an MRS is less than a threshold, the UE needs to change the primary beam (motivation 1). That is, if the primary beam does not satisfy a predetermined criterion, the UE may change the primary beam. In another example, if a preferred primary beam detected from an MRS has no relation to a current configured CSI-RS resource set (or subset), the UE needs to change the CSI-RS resource set (or subset) (motivation 2). In another example, if the UE fails to detect a secondary beam exceeding a threshold from the current configured CSI-RS resource subset, the UE needs to change the CSI-RS resource subset (motivation 3). That is, the UE may change an active CSI-RS resource set.

In consideration of the above situation, a CSI-RS resource update may be performed. More specifically, the UE may report BSI to the eNB. Herein, the reporting may be triggered by the network or the UE.

More specifically, the eNB may reconfigure a CSI-RS resource set (or subset) for the UE based on the updated primary beam information.

Considering the situations of motivation 1 and motivation 2, the CSI-RS resource set itself needs to be changed. Further, if the preferred primary beam detected from the MRS has no relation to the current configured CSI-RS resource set (or subset), the CSI-RS resource set itself needs to be changed.

If only the situation of motivation 3 is considered, only a CSI-RS resource subset in the CSI-RS resource set may be changed. Herein, the UE may determine a secondary beam by using the CSI-RS resource subset reconfigured by the eNB.

Further, for example, when the UE fails to detect an appropriate secondary beam (CSI-RS) or reports a beam recovery signal, the UE may expect update of an RS set of a transmission configuration indicator (TCI) through a higher-layer signal.

For example, the TCI may be defined in DCI. Based on Table 12, the UE may determine that a PDSCH is transmitted by a DL beam linked to a specific port of a CSI-RS according to a TCI index. For example, if TCI index=2 in Table 12 below, the UE may determine that the PDSCH is transmitted by a DL beam linked to CSI-RS #5.

For example, since Rx beams of the UE has orientation (or directionality), a different Rx beam may be used for each CSI-RS. Accordingly, the eNB needs to preliminarily indicate a DL beam direction through a CSI-RS. As such, the UE may adjust an Rx beam based on the direction of a beam transmitted from the eNB.

That is, the CI may be used to indicate a spatial Rx beam of the UE. The UE may receive a CSI-RS beam based on the CI and recognize the best Rx beam as corresponding to the CSI-RS beam. That is, the UE may empirically recognize the best Rx beam, while receiving the CSI-RS beam. Therefore, if the eNB indicates a CSI-RS to the UE, the UE may determine an Rx beam based on information related to the CSI-RS or empirical information. Then, the eNB may not need to receive a report of information about the Rx beam from the UE, and may determine the Rx beam according to implementation of the UE. That is, based on the above description, the TCI may be used indirectly to indicate an Rx beam of the UE, and the present disclosure is not limited to this embodiment.

For example, an RS set of a TCI may be reconfigured as illustrated in Table 12. That is, an update may be performed to reconfigure an appropriate CSI-RS. For example, when a problem occurs to a secondary beam or a beam recovery signal is reported as described above, a CSI-RS resource set may be reconfigured for the UE.

The eNB may reconfigure a CSI-RS resource set (or subset) for the UE based on updated primary beam information. Considering the situations of motivation 1 and motivation 2, the CSI-RS resource set itself needs to be changed. Further, if a preferred primary beam detected from an MRS is not related to a current configured CSI-RS resource set (or subset), the CSI-RS resource set itself needs to be changed. Considering only the situation of motivation 3, only a CSI-RS resource subset in a CSI-RS resource set may be changed. Herein, the UE may determine a secondary beam by using the reconfigured CSI-RS resource subset. That is, as the RS set of the TCI is reconfigured, it may be known that the CSI-RS resource set or the CSI-RS resource subset is reconfigured.

TABLE 12

| TCI index | RS set |
|---|---|
| 0 | CSI-RS #2, [TRS, DMRS, . . . ] |
| 1 | CSI-RS #7 |
| 2 | CSI-RS #7 |
| 3 | CSI-RS #7 |

2-6-1. CSI-RS Resource Update Triggered by Network

As described above, a case in which an RRM measurement is less than a threshold may be considered. If a reported RRM measurement is less than the threshold, the eNB may allocate a PUSCH resource for BSI reporting to the UE. The UE may report BSI on a PUSCH or a MAC-CE to the eNB. When the UE reports the BSI on the PUSCH, the UE may multiplex and transmit the BSI in the PUSCH resource. On the other hand, when the UE reports the BSI in a MAC-CE, the UE may include and transmit the BSI in the MAC-CE, and the eNB may be aware of the inclusion of the BSI in the MAC-CE. In another example, both of the PUSCH and the MAC-CE may be supported. Then, the eNB may also indicate which one between the PUSCH and the MAC-CE is to be used, when requesting BSI reporting.

In another example, the UE may transmit BSI in a MAC-CE to the eNB without an additional BSI reporting request from the eNB.

The eNB may update a CSI-RS resource set based on the reported information.

2-6-2. CSI-RS Resource Update Triggered by UE 2-6-2-1. RACH-Based

The UE may request change of a CSI-RS resource set to the eNB by an RACH signal in consideration of the situations of motivation 1 and motivation 2. For example, the RACH signal may be a contention-based RACH signal or a UE dedicated RACH signal. For example, the contention-based RACH signal is based on contention and thus may experience collision, thereby lengthening latency. In contrast, the UE dedicated RACH signal is contention-free and thus may avoid collision.

The eNB may allocate a UL resource to the UE by an RAR in a RACH procedure. That is, the eNB may receive an RACH preamble from the UE and allocate UL resources to the UE in response to the RACH preamble. Subsequently, the UE may report BSI in an RRC connection request or RRC connection re-establishment request message to the eNB. If the UE and the eNB have difficulty in communicating with each other by an existing configured beam pair due to movement of the UE or an obstacle, the UE needs to reconfigure a primary beam in the RACH procedure.

2-6-2-2. SR-Based

Considering the situations of motivation 1 and motivation 2, the UE may request change of a CSI-RS resource set to the eNB by an SR. that is, the eNB may allocate a PUSCH resource to the UE based on the received SR. The UE may report BSI in a MAC-CE to the eNB. The eNB may check the MAC-CE of the signal received from the UE and acquire the BSI (or primary beam information) from the MAC-CE.

2-6-2-3. PUCCH-Based

Considering the situations of motivation 1 and motivation 2, the UE may report a preferred CSI-RS resource or CSI-RS port on a PUCCH to the eNB. For example, the UE may report preferred primary beam information on the PUCCH. However, since PUCCH information has a small number of feedback bits, the UE may set the number of reported primary beams to 1 or a small number. Further, for example, the UE may report only the index of the preferred primary beam on the PUCCH, without transmitting the RSRP of the primary beam. That is, the UE may report only part of the BSI on the PUCCH.

In another example, a field that distinguishes preferred primary beam information from a preferred CSI-RS resource transmission may be defined in a PUCCH field. Further, for example, a field that distinguishes preferred primary beam information from a preferred CSI-RS port may be defined in a PUCCH field.

Further, for example, as the PUCCH has a small number of feedback bits, the eNB may allocate a PUSCH resource to the UE, and the UE may report BSI in the allocated PUSCH resource. The UE may not report a primary beam on the PUCCH. That is, the UE may request only a reconfiguration of a CSI-RS resource set on the PUCCH, while reporting BSI to the eNB on the PUSCH.

In another example, when the UE has reported a preferred primary beam on a PUCCH, the eNB may reconfigure at least one of a CSI-RS resource set or a CSI-RS resource subset for the UE.

The UE may perform beam management by using periodically transmitted PUCCH resources, without separately being allocated a UL resource through an SR. As such, only when beam management is required, the eNB may request reporting to the UE. Further, for example, if a PUCCH period is short, beam information may be reported faster than on an RACH, a MAC-CE, or a UL data channel. That is, this may be efficient when the location of the UE is frequently changed or movement of the UE is considered.

Further, for example, in the case where the UE intends to change a CSI-RS resource set but delay of RRM reporting makes it difficult to trigger changing of the CSI-RS resource set, the triggering may be made using a PUCCH, and the present disclosure is not limited to this embodiment.

In another example, considering the situation of motivation 3, the UE may request change of a CSI-RS resource subset to the eNB via the PUCCH. Herein, the UE may define a new field for requesting changing of a CSI-RS resource subset. Therefore, the UE may request changing of a CSI-RS resource subset via the PUCCH. Further, the UE may transmit BSI on the PUSCH in an L1 operation or report the BSI in a MAC-CE in an L2 operation. In the L1 operation, the BSI may be multiplexed in a PUSCH resource. In the L2 operation, as the eNB has requested BSI to the UE, the eNB may be aware that the BSI is included in the MAC-CE. Further, for example, the UE may support both of the PUSCH and the MAC-CE. Then, the eNB may indicate which of the two channels is to be used to the UE, when requesting BSI reporting. The UE may select a reporting method based on information included in the BSI reporting request, and the present disclosure is not limited to this embodiment.

In another example, the UE may request changing of a CSI-RS resource set by at least one of the afore-described RACH (2-6-2-1), SR (2-6-2-2), or PUCCH (2-6-2-3). Further, for example, the UE may request changing of an RS set of a TC by at least one of the afore-described RACH (2-6-2-1), SR (2-6-2-2), or PUCCH (2-6-2-3).

As described before, changing and reconfiguring an RS set of a TCI may mean reconfiguration of a CSI-RS resource set or a CSI-RS resource subset. For this purpose, the UE may request changing of the RS set of the TCI to the eNB.

2-7. Zero Power CSI-RS Resource

The eNB may indicate the position of a zero power CSI-RS to the UE on a CSI-RS resource basis. The positions of zero power CSI-RSs may be indicated by a bitmap. For example, referring to FIG. 23(a), $4^{th}$ to $7^{th}$ CSI-RS resources may be zero power CSI-RS resources. The eNB may indicate to the UE that the $4^{th}$ to $7^{th}$ CSI-RS resources are zero power CSI-RS resources. Then, the UE may perform puncturing in $4^{th}$ to $7^{th}$ OFFM symbols. For example, the eNB may transmit information about zero power CSI-RSs to the UE by RRC or MAC signaling.

In another example, zero power CSI-RS types may be configured. The eNB may indicate the zero power CSI-RS types to the UE by a bitmap. For example, referring to FIG. 23(b), two types of zero power CSI-RSs may be configured. The eNB may provide the UE with information about the configured zero power CSI-RS types in a bitmap by RRC or MAC signaling. Then, the eNB may indicate information indicating a specific type based on the configured type to the UE by DCI or MAC signaling, and the present disclosure is not limited to this embodiment.

Figure 24:
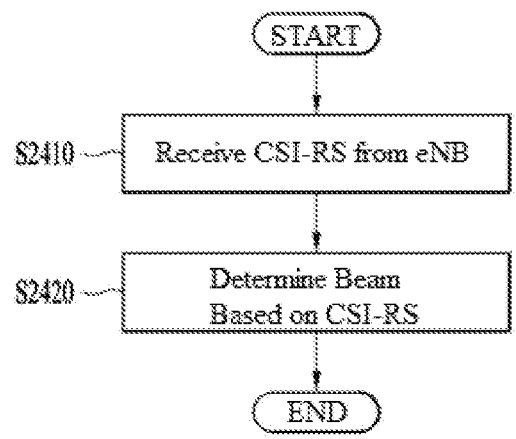
FIG. 24 is a flowchart illustrating a beam determination method in a communication system.

FIG. 24 is a flowchart illustrating a method of determining a beam to be used for communication by a UE in a communication system.

The UE may receive a CSI-RS from an eNB (2410). As described before with reference to FIGS. 1 to 23, the CSI-RS may be a reference signal for beam management. For example, the CSI-RS may be at least one of an MRS or an SS bloc. For example, a beam used by the UE may be determined based on the CSI-RS (or MRS) (S2420). As described before with reference to FIGS. 1 to 23, a CSI-RS resource and a CSI-RS port may be configured based on the CSI-RS (or MRS). The determined beam may correspond to the CSI-RS resource and the CSI-RS port. For example, a primary beam of the determined beam may correspond to the CSI-RS resource. Further, a secondary beam of the determined beam may correspond to the CSI-RS port. The secondary beam may be included in the primary beam. For example, the UE may feed back information about a preferred primary beam and information about a preferred secondary beam based on the CSI-RS to the eNB. The information about the preferred primary beam and the information about the preferred secondary beam may be fed back separately or jointly, as described before.

In another example, when a problem occurs to a primary beam, when a better primary beam is detected, or when a beam is not detected from the configured CSI-RS, a beam recovery procedure may be performed. The beam recovery procedure may be performed based on the foregoing P2 and P3 procedures, as described before. The eNB may transmit CSI-RS configuration information for the P2 and P3 procedures to the UE. The CSI-RS configuration information may include information about at least one of a cell ID, a transmission period, a time-domain offset, or a repetition number, as described before.

Device Configuration

Figure 25:
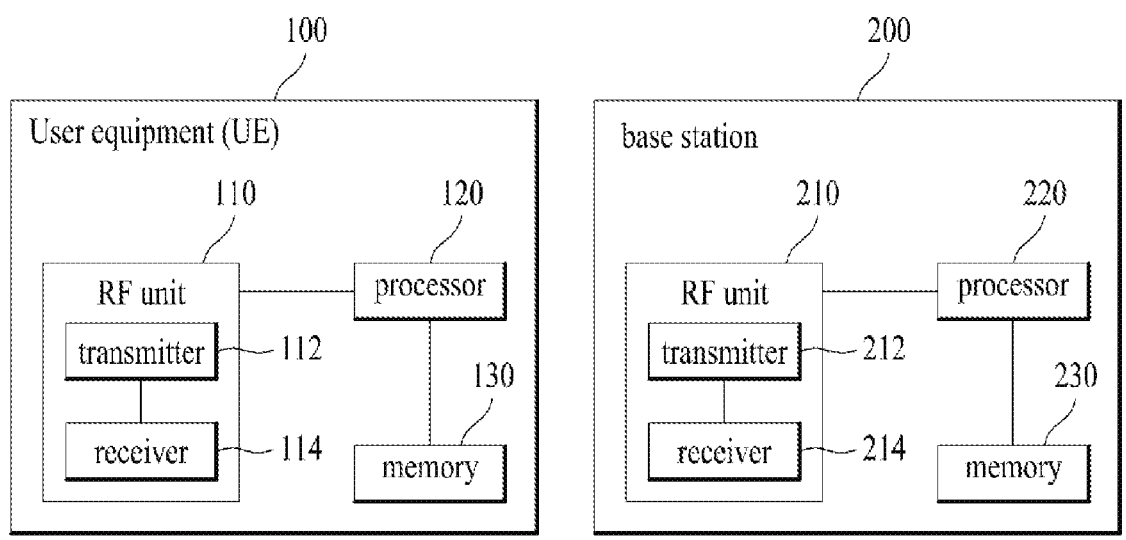
FIG. 25 is a block diagram illustrating a UE and a BS which are related to an embodiment of the present disclosure.

FIG. 25 is a block diagram showing the configuration of a UE and a BS according to one embodiment of the present disclosure. In FIG. 25, the UE 100 and the BS 200 may include radio frequency (RF) units 110 and 210, processors 120 and 220 and memories 130 and 230, respectively. Although a 1:1 communication environment between the UE 100 and the BS 200 is shown in FIG. 25, a communication environment may be established between a plurality of UEs and the BS. In addition, the BS 200 shown in FIG. 25 is applicable to a macro cell BS and a small cell BS.

The RF units 110 and 210 may include transmitters 112 and 212 and receivers 114 and 214, respectively. The transmitter 112 and the receiver 114 of the UE 100 are configured to transmit and receive signals to and from the BS 200 and other UEs and the processor 120 is functionally connected to the transmitter 112 and the receiver 114 to control a process of, at the transmitter 112 and the receiver 114, transmitting and receiving signals to and from other devices. The processor 120 processes a signal to be transmitted, sends the processed signal to the transmitter 112 and processes a signal received by the receiver 114.

If necessary, the processor 120 may store information included in an exchanged message in the memory 130. By this structure, the UE 100 may perform the methods of the various embodiments of the present disclosure.

The transmitter 212 and the receiver 214 of the BS 200 are configured to transmit and receive signals to and from another BS and UEs and the processor 220 are functionally connected to the transmitter 212 and the receiver 214 to control a process of, at the transmitter 212 and the receiver 214, transmitting and receiving signals to and from other devices. The processor 220 processes a signal to be transmitted, sends the processed signal to the transmitter 212 and processes a signal received by the receiver 214. If necessary, the processor 220 may store information included in an exchanged message in the memory 230. By this structure, the BS 200 may perform the methods of the various embodiments of the present disclosure.

The processors 120 and 220 of the UE 100 and the BS 200 instruct (for example, control, adjust, or manage) the operations of the UE 100 and the BS 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present disclosure may be called controllers, microcontrollers, microprocessors, microcomputers, etc. The processors 120 and 220 may be implemented by hardware, firmware, software, or a combination thereof.

If the embodiments of the present disclosure are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

In a firmware or software configuration, the method according to the embodiments of the present disclosure may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present disclosure has been given to enable those skilled in the art to implement and practice the disclosure. Although the disclosure has been described with reference to the preferred embodiments, those skilled in the art will appreciate that various modifications and variations can be made in the present disclosure without departing from the spirit or scope of the disclosure described in the appended claims. Accordingly, the disclosure should not be limited to the specific embodiments described herein, but should be accorded the broadest scope consistent with the principles and novel features disclosed herein. Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Both of a product invention and a method invention have been described in the disclosure, and may be applied complementarily, when needed.

INDUSTRIAL APPLICABILITY

The aforementioned contents can be applied not only to a 3GPP system and an LTE-A system but also to various wireless communication systems including an IEEE 802.16x system and an IEEE 802.11x system. Further, the proposed method can also be applied to an mmWave communication system using an ultrahigh frequency band.

The invention claimed is:

1. A method of determining a beam to be used for communication by a user equipment (UE) in a millimeter wave (mmWave) communication system, the method comprising:
   receiving a channel state information-reference signal (CSI-RS) from a base station (BS); and
   determining the beam based on the CSI-RS;
   wherein a CSI-RS resource and a CSI-RS port are determined based on the CSI-RS,
   wherein the determined beam corresponds to the CSI-RS resource and the CSI-RS port,
   wherein the CSI-RS resource corresponds to a primary beam, and the CSI-RS port corresponds to a secondary beam within the primary beam,
   wherein the UE acquires information about at least one primary beam and information about at least one secondary beam based on the received CSI-RS, and feeds back a CSI-RS resource index corresponding to a preferred primary beam among the at least one primary beam with a first period and a CSI-RS port index corresponding to a preferred secondary beam among the at least one secondary beam with a second period to the BS, and
   wherein the first period is longer than the second period.

2. The method according to claim 1, wherein the information about the preferred primary beam and the information about the preferred secondary beam are transmitted in at least one of a random access channel (RACH), a medium access control-control element (MAC-CE), or uplink data.

3. The method according to claim 1, wherein when the UE changes the determined beam, the UE changes the beam based on a P2 procedure and a P3 procedure, and
   wherein the P2 procedure is a procedure in which the beam is changed by sweeping downlink transmission beams of the BS and fixing an uplink reception beam of the UE, and the P3 procedure is a procedure in which the beam is changed by fixing a downlink transmission beam of the BS, and sweeping uplink reception beams of the UE.

4. The method according to claim 3, wherein the UE receives CSI-RS resource configuration information for the P2 procedure and the P3 procedure from the BS, and
   wherein the CSI-RS resource configuration information includes information about at least one of a cell identifier (ID), a transmission period, a time-domain offset, or a repetition number.

5. The method according to claim 4, wherein the BS transmits the downlink transmission beam according to the repetition number in the P3 procedure.

6. The method according to claim 1, wherein the primary beam corresponds to a wide beam or rough beam, and the secondary beam corresponds to a narrow beam or fine beam.

7. The method according to claim 1, wherein the primary beam is at least one of a synchronization signal block (SSB), a CSI-RS, or a measurement reference signal (MRS), and the secondary beam is a CSI-RS.

8. The method according to claim 1, wherein when the UE fails to detect a configured secondary beam or reports a beam recovery signal, the UE reconfigures a CSI-RS resource set or a CSI-RS resource subset by a higher-layer signal.

9. The method according to claim 8, wherein the UE requests changing of the CSI-RS resource set or the CSI-RS resource subset by at least one of a random access channel (RACH), scheduling request (SR), or a physical uplink control channel (PUCCH).

10. A user equipment (UE) for determining a beam to be sued for communication in a millimeter wave (mmWave) communication system, the UE comprising:
    a receiver configured to receive a signal from an external device;
    a transmitter configured to transmit a signal to an external device; and
    a processor configured to control the receiver and the transmitter,
    wherein the processor is configured to receive a channel state information-reference signal (CSI-RS) from a base station (BS) through the receiver, and to determine the beam based on the CSI-RS;
    wherein a CSI-RS resource and a CSI-RS port are determined based on the CSI-RS,
    wherein the determined beam corresponds to the CSI-RS resource and the CSI-RS port,
    wherein the CSI-RS resource corresponds to a primary beam, and the CSI-RS port corresponds to a secondary beam within the primary beam,
    wherein the UE acquires information about at least one primary beam and information about at least one secondary beam based on the received CSI-RS, and feeds back a CSI-RS resource index corresponding to a preferred primary beam among the at least one primary beam with a first period and a CSI-RS port index corresponding to a preferred secondary beam among the at least one secondary beam with a second period to the BS, and
    wherein the first period is longer than the second period.

11. The UE according to claim 10, wherein the information about the preferred primary beam and the information about the preferred secondary beam are transmitted in at least one of a random access channel (RACH), a medium access control-control element (MAC-CE), or uplink data.

12. The UE according to claim 10, wherein when the UE changes the determined beam, the UE changes the beam based on a P2 procedure and a P3 procedure, and
    wherein the P2 procedure is a procedure in which the beam is changed by sweeping downlink transmission beams of the BS and fixing an uplink reception beam of the UE, and the P3 procedure is a procedure in which the beam is changed by fixing a downlink transmission beam of the BS, and sweeping uplink reception beams of the UE.

13. The UE according to claim 12, wherein the processor is configured to receive CSI-RS resource configuration information for the P2 procedure and the P3 procedure from the BS, and wherein the CSI-RS resource configuration information includes information about at least one of a cell identifier (ID), a transmission period, a time-domain offset, or a repetition number.

* * * * *